US009500377B2

(12) United States Patent
Viswanathan

(10) Patent No.: US 9,500,377 B2
(45) Date of Patent: Nov. 22, 2016

(54) EXTENSIBLE NETWORKED MULTI-MODAL ENVIRONMENT CONDITIONING SYSTEM

(71) Applicant: Mahesh Viswanathan, Cambridge, MA (US)

(72) Inventor: Mahesh Viswanathan, Cambridge, MA (US)

(*) Notice: Subject to any disclaimer, the term of this patent is extended or adjusted under 35 U.S.C. 154(b) by 477 days.

(21) Appl. No.: 13/854,083

(22) Filed: Mar. 30, 2013

(65) Prior Publication Data

US 2013/0259456 A1 Oct. 3, 2013

Related U.S. Application Data

(60) Provisional application No. 61/618,828, filed on Apr. 1, 2012.

(51) Int. Cl.
| | |
|---|---|
| *A45D 20/40* | (2006.01) |
| *F24D 13/00* | (2006.01) |
| *F24C 1/00* | (2006.01) |
| *F24D 19/10* | (2006.01) |
| *F24F 1/00* | (2011.01) |
| *F24F 5/00* | (2006.01) |
| *G05B 15/02* | (2006.01) |

(52) U.S. Cl.
CPC ............. *F24D 13/00* (2013.01); *F24C 1/00* (2013.01); *F24D 19/1084* (2013.01); *F24F 1/00* (2013.01); *F24F 5/00* (2013.01); *G05B 15/02* (2013.01); *G05B 2219/2642* (2013.01)

(58) Field of Classification Search
CPC ...... F24C 1/00; F24D 13/00; F24D 19/1084; F24F 1/00; F24F 5/00; G05B 15/02; G05B 2219/2642
USPC ................. 392/407; 700/275, 291; 315/159; 340/2.24, 567, 635
See application file for complete search history.

(56) References Cited

U.S. PATENT DOCUMENTS

| | | | | |
|---|---|---|---|---|
| 8,538,581 | B2 * | 9/2013 | Kuehnrich et al. | ........... 700/237 |
| 8,924,218 | B2 * | 12/2014 | Corpier et al. | ............... 704/271 |
| 2007/0114292 | A1 * | 5/2007 | Breed | ................ B60H 1/00742 236/49.3 |
| 2007/0257188 | A1 | 11/2007 | Robertson et al. | |
| 2008/0195347 | A1 | 8/2008 | Gatt | |
| 2008/0215040 | A1 | 9/2008 | Paithankar | |
| 2009/0271042 | A1 * | 10/2009 | Voysey | ......................... 700/275 |
| 2011/0106627 | A1 * | 5/2011 | LeBoeuf et al. | ........... 705/14.66 |
| 2011/0113120 | A1 * | 5/2011 | Johnson et al. | .............. 709/218 |
| 2012/0316693 | A1 * | 12/2012 | Ogawa | ...................... H02J 3/14 700/295 |
| 2013/0259456 | A1 * | 10/2013 | Viswanathan | ................ 392/407 |
| 2014/0156084 | A1 * | 6/2014 | Rahman et al. | .............. 700/276 |

FOREIGN PATENT DOCUMENTS

| | | | |
|---|---|---|---|
| GB | 2238405 | * | 5/1991 |
| WO | 2010151370 Y | | 12/2010 |

OTHER PUBLICATIONS

International Search Report and Written Opinion mailed Aug. 13, 2013 issued in PCT/US2013/034742.

\* cited by examiner

*Primary Examiner* — Dana Ross
*Assistant Examiner* — Joseph Iskra
(74) *Attorney, Agent, or Firm* — ZIP Law PLLC; Claire Zopf

(57) ABSTRACT

A distributed, self-organizing environment conditioning system with adaptive and learning behaviors that provide localized and targeted climate conditioning such as, but not limited to, temperature and humidity control in indoor and outdoor settings and more particularly, to extensible networked multi-modal autonomous systems of heating units working together to efficiently target objects for selective environmental control.

18 Claims, 17 Drawing Sheets

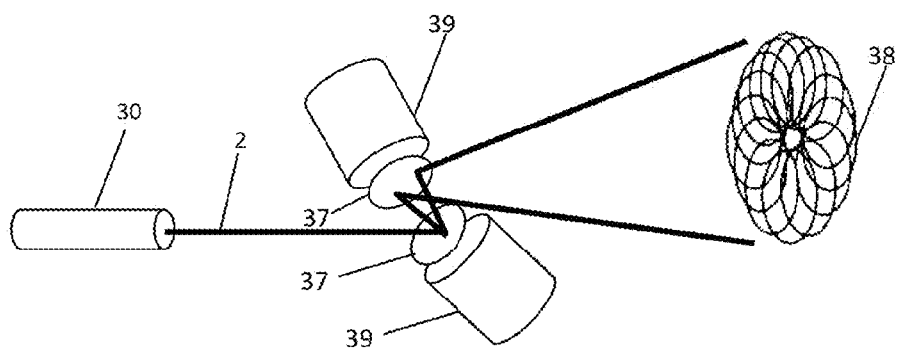
FIG. 5
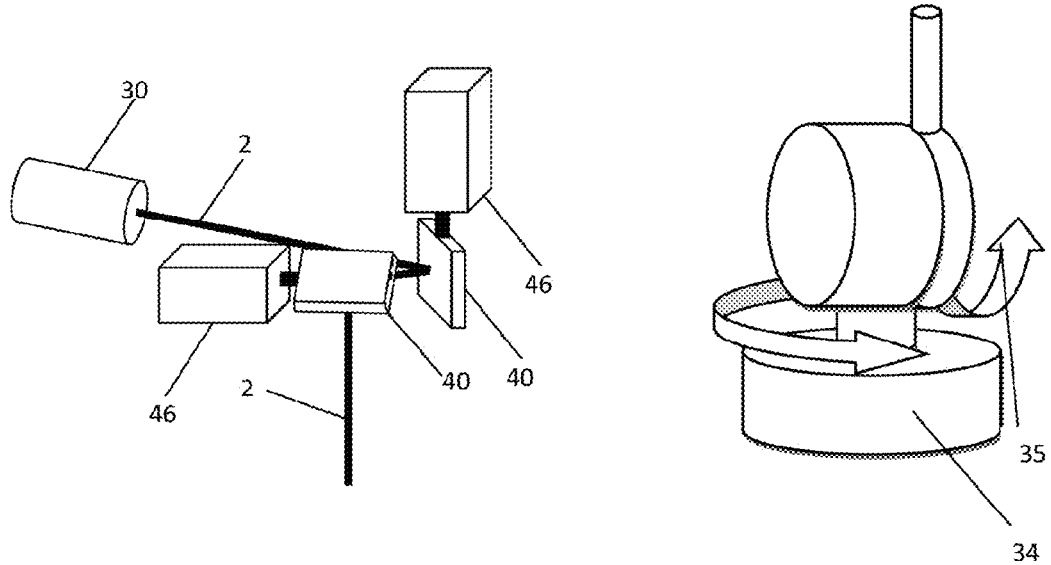
FIG. 5a                    FIG. 5b

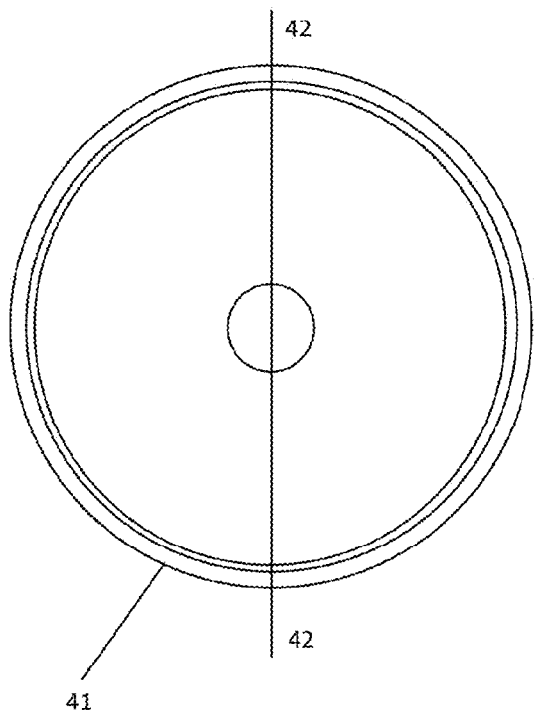
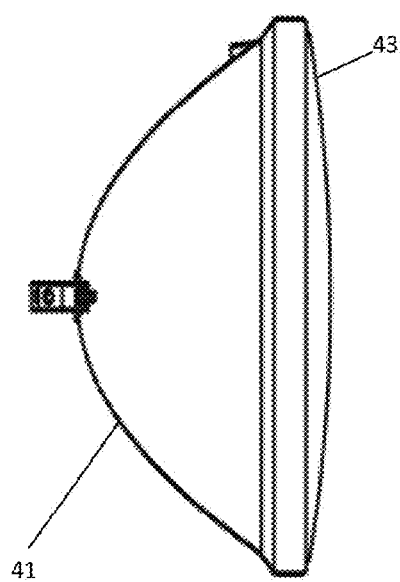
FIG. 6a  FIG. 6b
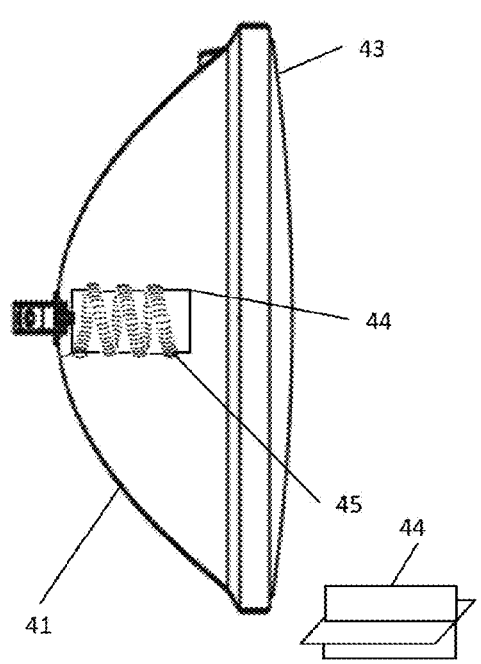
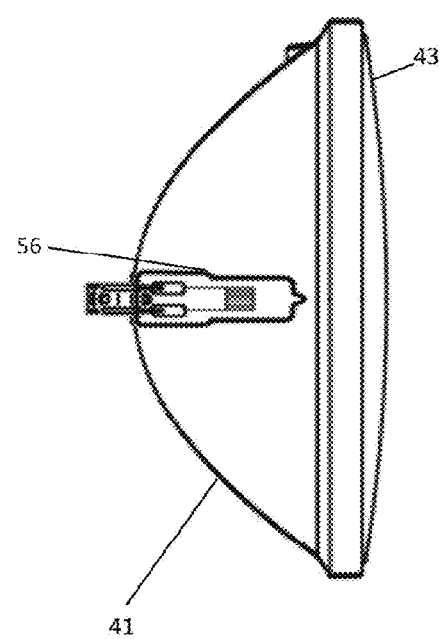
FIG. 7a   FIG. 7b   FIG. 8

EXTENSIBLE NETWORKED MULTI-MODAL ENVIRONMENT CONDITIONING SYSTEM

CROSS REFERENCE TO RELATED APPLICATIONS

This application claims the benefit of U.S. Provisional Application No. 61/618,828 filed Apr. 1, 2012 and entitled EXTENSIBLE NETWORKED MULTI-MODAL ENVIRONMENT CONDITIONING SYSTEM which is herein incorporate by reference.

FIELD OF THE INVENTION

The present invention is in the technical field of distributed, self-organizing environment conditioning systems with adaptive and learning behaviors that provide localized and targeted climate conditioning such as, but not limited to, temperature and humidity control in indoor and outdoor settings and more particularly, to extensible networked multi-modal autonomous systems of heating units working together to efficiently target objects for selective environmental control.

BACKGROUND OF THE INVENTION

Current indoor heating systems are inefficient and expensive, heating the whole room in order to heat the people inside it, so that a person can move around freely within that space. Both forced hot air and hydronic systems (circulating hot water or steam, such as baseboard heaters, used extensively in the northern United States) heat mostly via convection, which is very inefficient. They heat the air, which circulates and eventually heats up points of need (PONs) and all objects in the room. Hot air rises, so the warmest part is usually the ceiling, the most unutilized part of the environment. Hydronic systems are often called radiators however they are principally convection devices with only a small portion of the energy being transferred by radiation. This radiation component heats objects directly without warming the air in between, such as electric oil-filled heaters where the oil is heated and circulated within a device that has fins to distribute heat from the device. The radiation is therefore poorly used with the energy decreasing exponentially with the distance from the source because it spreads in all directions: this is the inverse square law of Physics. Other heating systems such as radiant floor heating systems provide an improvement because the temperature decreases with height, where the warmth is near the bottom of a room and is colder as you go higher, thus most of heat stays in a utilized area. This is better than convective systems because the temperature decreases with height, thus most of it stays—closer to the floor. The systems are therefore considered to have a good temperature profile where the heating is stable (the floor acts as a thermal store), but the system still heats the entire floor and room and does not take into consideration where an occupant is; furthermore, it typically takes time for the floor to warm up and cool down, so there is a latency. Note that some convection is also created by this type of heating. Radiant floor heating is also expensive to install.

Other systems such as Electric Thermal Stores (ETS) use electricity to heat an object such as ceramic bricks or certain inorganic salt solutions. These materials have a very high capacity to store energy (Thermal Mass) and then release it when unplugged. They are useful when daytime (peak) electric tariffs are higher than nighttime (off-peak). The ETS is plugged in during the night to charge and unplugged during the day to discharge the heat. These have been in use in Europe since the 1940s, but aren't common in the United States except in some rural electric cooperatives where dual tariffs exist. An ETS, thus, transfers energy temporally, i.e. over time, in addition to transferring it spatially. Additionally "Near-zero" energy technologies exist to heat homes and offices that take advantage of insulation, shading, heat exchange with the outside, solar panels, wind turbines, etc., but each system requires expensive reengineering if not a complete redesign of the building. Various other devices, such as thermostats learn the user's behavior pattern exist, but are also expensive and ultimately use the existing heating system of the house or office, which can be an inefficient component. These devices do offer some savings by creating a heating plan that adapts as the person's usage changes and some systems provide home networking products specifically designed for controlling appliances.

Other heating systems, such as portable electric heaters or outdoor radiant heaters used at bus stops, hotel entrances and restaurants (whether gas or electrically powered) are efficient, but only if the person sits and remains in close proximity to the device. In any of these systems, the radiation is poorly used where the radiant energy decreases exponentially with distance from the source as it spreads in all directions, the inverse square law of Physics, and where areas are heated where there are no people. These systems therefore waste energy heating these areas where in general it takes a 1500 W heater to make a 10'×10' room comfortable in winter.

Fans are also used with some radiant heaters to help circulate air faster, thus improving convection and increasing the range of heat delivery. There are various fan and heating element designs but they all depend on raising the temperature of air by forcing it under pressure over or through heated elements to transfer the heat. The air is then blown out of the device. Hot air can dry out the environment.

Taking into consideration that skin absorbs electromagnetic infrared (IR) radiation at wavelengths from 780 nm to 1 mm, which is felt as heat, an IR-A wavelength range of between 780 nm to 1400 nm centered on 1,000 nm provides the best sensation of heat as it has greater penetrating power. This means that the heat is dissipated in a larger skin volume, creating more pleasant and diffuse warmth. For example, the average male adult human has a surface area (skin) of two square meters, front and back with approximately 75% of the body heat loss (or gain) is from radiation. While average body temperature is 36.67° C./98.4° F. internally the human body generates about 130 W (watts) of power and needs to lose this power to the environment so that we don't overheat. For us to feel comfortable, neither cold nor hot, the ambient temperature should be about 26° C./78° F. at desirable humidity levels of between 30% to 60%. Forced air heating systems tends to dry the air out effecting desirable humidity levels and our feeling of warmth. If a thermostat is maintained at 20° C./68° F., the temperature at the body needs to be elevated by 6° C./10° F. to get to the comfortable 26° C., which takes 68 W for the entire body, or 3.4 mW/cm2 (milliwatts/square centimeter). Thus, at this point of need (PON) it takes 34 W to heat one side of the body or 11 W to heat one-third of the front of the body, assuming that the other two-thirds is covered by clothing. Thus, a system that transfers heat directly to the points of need (PONs) with the freedom of mobility and targeted efficiency would be desirable.

SUMMARY OF THE INVENTION

The distributed, self-organizing environment conditioning system provides localized and targeted climate conditioning with adaptive and learning behaviors to target temperature control in an environment to a point of need (PON). The system comprises one or more devices of one or more types deployed in one or more settings to provide climate conditioning. A device is a package comprising one or more functional modules. Different types of devices have different packages of functional modules. The system does not define limits for what constitute functional modules or devices. Devices may have interlocking mechanisms to physically connect them with other devices. Devices can communicate with each other provided they have the necessary module(s). Devices can work autonomously or in conjunction with others as a system in a network within which they self-organize. This provides sophisticated abilities of adaptability, perception and learning to provide efficient use of energy.

Considered broadly, the system comprises devices which in turn comprise modules. A device is considered to be a physical integral unit comprising one or more modules for PROCESSING, COMMUNICATION, INPUT, OUTPUT, POWER and SOFTWARE. Devices have interlocking mechanisms to physically connect them with other devices. Devices work autonomously or in conjunction with other devices in an installation, within which they self-organize. This provides sophisticated abilities of adaptability, perception and learning to provide efficient use of energy. Devices are designed to be easily programmable by the user and hobbyist communities, allowing them to make their own modifications, thereby allowing for faster innovation and best-of-breed enhancements in signal processing, enhancements that can be propagated to devices in installations worldwide via software updates. One design principle being used is to take advantage of the relative low cost of today's microprocessors by building devices using lower-cost, less accurate physical components but compensating for that by using more sophisticated algorithms.

Devices can also be interfaced to external computing devices for the internet for further control as part of an "Internet of Things," a term coined in 1999 to refer to uniquely identifiable objects (things) and their virtual representations in an Internet-like structure. Modules are functional units that reside within a device. Hardware and software modules are contemplated. Modules comprise parts. Software modules reside within hardware modules. The present invention does not set limits on the types or number of unique devices or modules or on their function.

As described herein, the system comprises an extensible set of functional modules, both physical (hardware) and software. Modules include, but are not limited to heat transfer elements, focusing optics & waveguides, band-stop and band-pass filters for electromagnetic radiation, robotic targeting platforms, microcontrollers, software, sensors (such as but not limited to digital video cameras, microphones, pyrometers, remote control receivers), remote controls, range finders, servo control boards and servos, thermometers with digital output, speakers, touchscreen interfaces, keypad interfaces, lights to indicate device status, wireless and wired network interfaces, thermal stores for heating and for cooling and their charging stations, robotic platforms, battery packs, docking stations, humidifiers with interfaces for computer control and stands to mount various devices.

Some modules can work independently (processors and effectors); others are dependent such as modifications of other modules (elements that condition the output of the effectors) with devices performing in areas, mostly via radiation and convection, to and from the target object for heating and cooling, respectively, using one or many functions of one or many device types.

The present invention is directed to a method and apparatus for a distributed, dynamically self-organizing system with adaptive and learning behaviors, comprising devices of one or many types to provide energy efficient environment conditioning (also called climate conditioning or climate control in this document) indoors and outdoors to suit the needs of animate (human or animal) or inanimate objects within that environment. In the present invention, one or many of the devices work autonomously or together to provide a heuristically optimal climate for the settings that they are in. Devices also provide and consume current and historical data about the environment in digital or analog formats. Contemplated systems include physical devices for the monitoring and control of temperature (heating & cooling), humidity, shade, air circulation, air quality and odors among others.

In the distributed, self-organizing environment conditioning system, a module provides highly focused radiation using electromagnetic (EM) waves such as infrared heat, laser emission or microwaves to target and heat only the point of need areas desired, even from a large distance. Another module is a robotic platform with a tilt-pan tray on which a module such as the focused EM device described above can be mounted. Another type of module is a thermal store which is heated or cooled at an energy source and can then be moved to the point of need for controlled heating or cooling of the area. The thermal store can signal when it needs to be charged, i.e. be heated or cooled again. Another type of module is a robotic platform for carrying a payload such as the thermal store to a desired destination. The platform can return to a base station when it is issued a signal to do so, for example, when it needs to recharge its battery or its payload needs to recharge itself. Another type of module is a controller attached to one or more of the modules listed above to get sensor data and/or to control the functioning of the module. Controllers may be standalone or part of a device. If connected to network modules, the controllers can connect with other controllers to self-organize and share information and enhance functionality over the environmental setting(s) they are in. Some examples of shared information are: sensor data, list of capabilities, user preferences and dynamically generated maps of the settings.

In a first embodiment of the conditioning system of the present invention comprises a controller, a heating element with focusing optics and an infrared pass-through (band-pass) filter on a robotic tilt-pan tray on which is also fitted a digital camera providing a video feed to the controller. The software in the controller performs image processing on the video feed to detect and track people in the video frame and directs the tilt-pan robot to move such that the heat is focused on a selected person. Software modules within the system provide data for analysis and control purposes within a software framework. These modules can be replaced, modified or extended using specified hardware and software (APIs) interfaces for, among other uses, behavior modification and software updates.

The set of devices of the present invention installed within a network provides for at least one device being aware of the location and functionalities offered by all other devices and modules. This information, the location and functionality, is defined as a System Map. The System Map is distributed and shared with any devices with the capability to request and/or to receive it. A dynamic routing table is created from the System Map. Devices in the installation are able to communicate with other devices either directly or indirectly via another device that acts as an ad-hoc router. Addition, removal and relocation of devices in the installation is detected and used to update the System Map.

The physical area covered by the installation is defined as a Settings. A Setting is defined as a part of a Settings that is convenient for individual analysis. A Setting is contemplated to be a room, a hall, a doorway, a part of a warehouse, among others. Settings can be dynamically or statically configured. Within the Settings, devices with and without communication modules are contemplated. Devices with communication modules broadcast their location and capabilities periodically and also send this information at any time a query is received from any other device. This is used to update the System Map and Settings information. Absence of a device reporting its information within a grace period will cause the device to be removed from the System Map, which will then be rebroadcast for syndication with the remaining devices in the installation. Devices without communication modules are detected by other devices with both appropriate sensors and communication modules.

Contemplated sensors include digital cameras, microphones and pyrometers, among others. Sensors are used to look for telltale signatures of other devices including shape, sound, color and heat output. Processors are digital and non-digital modules. All suitable processors are contemplated including computers, general-purpose microcontrollers, dedicated microcontrollers, analog control systems, digital signal processors, FPGAs, GPUs (graphical processing units), among others. All suitable communication modes for input and output are considered including software adherent to the Open Systems Interconnection (OSI) model (ISO/IEC 7498-1), which includes TCP/IP and other networking protocols on a physical layer. Contemplated physical layers include EIA/TIA-232, EIA/TIA-449, ITU-T V-Series, 1.430, 1.431, PDH, SONET/SDH, PON, OTN, DSL, IEEE 802.3, IEEE 802.11, 802.15.4, IEEE 802.15, IEEE 802.16, IEEE 1394, ITU-T G.hn PHY, USB, Bluetooth, RS-232, RS-449, pulse-width modulation (PWM) and serially sent data with clock signals, among others. Included too are software interfaces listening to a network port such as a TCP or UDP port, or a web server utilizing the http or https protocols, among others.

Contemplated communications transmitted between modules and external devices include current and historical information. External devices are defined as physical devices and software not principally designed to interact with the current inventions, but which may be communicated with by the use of physical and/or software adapters. Contemplated information includes digital video feeds, global and local locations of devices and regions of interest (ROIs) identified by the devices, spatial maps of the environment, wide or localized temperature, current weather, any relevant information from the internet, humidity level, brightness, air quality, and odors, among others. Contemplated ROIs include spatial information on humans, of objects or of motion in the vicinity of a device. All contemplated communications are considered to be secured or non-secured. All encryption algorithms for securing communications are considered including RSA, SHA-2, Rijndael, Blowfish, Twofish, among others.

Contemplated input modules include sensors and communications received from other devices. Contemplated sensors include digital cameras, microphones (for voice, claps, and other audible commands), remote control receivers, non-contact temperature sensors (pyrometers with a D:S—distance to spot—ratio of 10:1 or higher), keypads for data entry, humidity measurement sensors, range finders, proximity sensors, cliff sensors (so a mobile device does not fall off an edge), among others. All suitable communication modes for input are considered as listed in the communication modules above.

Contemplated output modules include those for effecting changes to the environment ("effectors"), those for providing mobility and those communicating with people or with other devices internal or external to the system. Contemplated Effectors include those for temperature, humidity, shade and air circulation, mobile platforms, amongst others. Effectors are contemplated to have ranges of influence that are narrow, wide, near (shallow) or far (deep). Contemplated Effectors for mobility include robotic platforms that are able to carry a payload to a determined location. Effectors for mobility also include robotic targeting platforms utilizing tilt-pan trays powered by motors including servo, stepper and ordinary motors. Robotic platforms are tethered to a power source or untethered. Untethered platforms have integral or external batteries as the power source.

Contemplated Effectors for heating are portable and non-portable. Portable heaters include those that are able to project focused radiant heat at a distance (greater than 7 feet) in addition to the commonly known methods of blowing hot air, projecting radiant heat at a medium distance (less than 7 feet), contact devices including electric blankets, and mobile thermal storage devices, among others. Non-portable systems include hydronic systems that use a circulating heated fluid in a pipe to provide warmth to the area it is in, forced hot air from a central heating system and radiant underfloor heating. Contemplated effectors for cooling are portable and non-portable. Contemplated portable devices include pedestal and table fans, portable air conditioners, mobile thermal stores, air coolers (that use evaporation of water to cool forced air), among others. Contemplated non-portable devices include wall and ceiling mounted fans and central air conditioning devices, among others. All suitable communication modules for output are considered to use the same technology as used for communications input modules already listed.

All power delivery modules ("power modules") are considered for use with the other modules of the system. Contemplated power modules are electric and non-electric. All power modules are interfaced to a processor. The processor sends signals to the power module and receives signals from it. All signals from the processor to the power module are considered including on, off, direction to set the voltage and direction to set the maximum current. All signals to the processor from the power module are considered including the voltage and current and temperature of the power module, among others.

Contemplated electric power modules are either connected to a wall socket to the building's power or are batteries (one-time use or rechargeable). Many electric power modules are contemplated including AC and DC sources at all frequencies and voltages. Commonly available voltages of 240V, 230V, 220V, 140V, 120V, 110V, 82V, 36V, 24V, 12V, 5V, 3.3V, 1.5V, 1.2V, −5V, −12V are considered, among others. All AC frequencies are considered including the commonly available frequencies of 50 Hz and 60 Hz. Power modules have safety cut-offs which activate when current surges are detected. Safety cut-off devices considered include circuit breakers, fuses and computer-controlled switches, among others. Non-electric power modules considered provide energy through the combustion of fossil fuels including natural gas and propane. The energy from this is principally used to heat an element to transfer the heat to the environment. Docking stations are power devices that are used by mobile devices to charge their batteries and to charge the payload of the mobile device should it be appropriate.

Contemplated software modules in the present invention include software to which changes and additions may be made easily to enhance functionality or to add new kinds of devices. The software is distributed and modular, with clearly published and modifiable Application Programming Interfaces (APIs). The set of APIs and their implementations effectively create a distributed Operating System (OS). Some of the underlying software is available from open source sources, i.e. the software and its source code are available "gratis" (zero price) and "libre" (with little or no restriction in usage, modification and distribution). Some of the software packages used may be OpenCV, OpenFrameworks and OpenTLD for image processing, Java and C++ for the programming environments and Linux, MySQL, Apache and JavaScript for web-server based control interfaces.

The contemplated APIs include interfaces to:
Discover information on the state of the Setting, the devices therein and their capabilities.
Get the 3D layout of the area based on images taken from non-identical locations.
Get the list of current devices in the Setting and their locations and capabilities.
Get the position of regions of interest (ROIs) in an image, including persons, animals, chairs, tables, sofas and other objects of interest to humans.
Get the ambient temperature, optimal paths for traversal of mobile units and the locations of off-limits areas for climate-control.
Get user commands from the remote control or network interface and act on them including positioning of lasers and TSUs, and urgent shut-off commands.
Get software updates and automatically implement them.
Transmit error and status codes.
Start test modes.
Establish communication with other units or external network objects such as computers.
Route data between other devices when required. Devices in an implementation that cannot directly communicate with each other, say due to an impediment such as a wall blocking wireless transmission between them, can expect data packets to be routed by an intermediary provided all the devices are within the same installation ("installation" as defined earlier).
Set the position of a tilt-swivel tray, including one on which a camera and a targeting device such as a radiant heater are mounted. The positioning is typically done in response to information on the location of the object that needs the climate control.
Set the sensitivity of a microphone, camera, pyrometer or other input or output module.
Set the traversal path for a mobile module such as a robotic platform.
Set the "noise" level for a robotic platform so that its artificial neural network (ANN) is less likely to get stuck in a corner as it navigates a layout in an attempt to reach its destination. This helps in "jiggling" it out of a dead end.
Send a command to a mobile robotic platform to return to a particular docking station.
Get and set charging levels in a TSU or BU.
Set the "glow" of a TSU.
Get the ID of a particular Tracer and triangulate towards it.
Get the power level of a RPU or BU.
Get and set the laser power levels in the Laser Heads of an EMU.
Get and set event listeners to all actions performed via software to chain other software functions to be executed either prior to or after the action and to optionally cancel the action entirely.

Contemplated Software modules include gesture tracking, human detection & tracking, among others. Gesture tracker ("GESTURE"). This software module compares sequential frames from a video stream to compute differences which are used to identify the regions in the image where motion occurs. Subsequent locations of motion are compared to detect the locus of the object in motion. Gestures of interest contemplated include waving of the arm and drawing clockwise and anti-clockwise circles in the air with the hand. If an object oscillates around a central point in a mostly horizontal manner, with the average amplitude of motion about the same as the width of the bounding box of the object in motion AND the frequency of the motion is about 1 Hz, the typical speed at which a human waves his or her arm AND the oscillatory behavior persists for a minimum of 5 oscillations, then a human is deemed to have waved to the device. Similarly, the module detects clockwise or anti-clockwise circular motion by looking at the oscillation of the motion around a central point in both the horizontal and vertical directions such that the frequency is about 1 Hz AND that the deviation from the horizontal average is lowest when the deviation from the vertical average is highest and vice versa. This represents the basic equation of a unit circle, $\sin 2(t) + \cos 2(t) = 1$ for angle t.

The human detection and tracking software module ("HUMDET") processes images from a digital video stream, looking for humans by using a combination of motion detection using differences between sequential frames from a video stream, face detection, body detection and other feature tracking and feature detection routines. Once the location of the region of interest (ROI)—typically a bounding box in the video frame—is determined to be an object worth tracking, it is tracked both spatially and temporally so that the location of the object is known at all times.

The module predicts the locus of motion of the object based on its history, both recent and long-term. This information is used to anticipate its new location. Long-term sophisticated learning can be programmed to, for example, heating chairs and sofas before they get used, based on historical usage patterns. Objects that go outside the video frame are reacquired as targets when they reenter at the same location. When given information on the location of the camera, the module keeps track of its position to calculate the ROIs local and global coordinates (i.e. the one in which the camera exists). The HUMDET module also records and uses the velocity (i.e. speed and direction) and acceleration of objects so that it continues to accurately track them even when their motion is occluded by, say, a column or a piece of furniture. Extending this logic further, objects are accurately tracked even when multiple objects cross each other's paths. This is important so that the targeting does not jump from one object to another.

In an embodiment, the installation of a distributed, self-organizing environment conditioning systems that may be referred to herein as a Haser comprises contains devices such as a Rover, a Control Unit, and a "HotHead". The Rover comprises a motor and a robotic tilt/pan tray. The Control Unit (CU) comprises a microcontroller or processor and sensors from the contemplated list of sensors described earlier. The processor processes the information from the sensors, especially the video stream to locate any humans in a Setting using the HUMDET software module. When a waving arm is detected by the GESTURE software module, the processor fixates on the object at the location where the gesture was made. It targets the tilt-pan tray of the Rover such that the object is dead-center in the video frame of the camera—and thus also the target of the Haser.

If a waving hand (or arm) is detected at another location, the processor disengages from the current object being tracked and starts tracking the new object. It targets the Rover to point at the new location. The GESTURE software module is installed on the processor. If a clockwise motion is detected (i.e. anti-clockwise from the viewpoint of the person looking at the Haser), power to the heating element is decreased. If an anti-clockwise motion is detected (i.e. clockwise from the viewpoint of the person look at the Haser), power to the heating element is increased.

In this described embodiment, one Haser may be provided for each person—and may be thought of as a replacement for a personal heater—where the software has logic to determine which Haser tracks which person when there is more than one person and more than one Haser in a Setting. Each Haser has an indicator that lights up randomly every 10-20 seconds to show that it is receptive to seeing a hand-wave. If the GESTURE module detects a hand-wave during the time the indicator is lit, the Haser targets the object at that location. As the indicators light up randomly each Haser can be directed to a particular person waving a hand at the time its indicator is lit.

The Rover is a Thermal Store Unit (TSU) mounted on a robotic platform with a sensor complement including digital cameras, cliff detectors, proximity sensors, wifi, etc. In communicating with the processor of the HotHead the Rover is directed using the GESTURE software module to detect the person who waved at it and move to get closer to that person. The Rover device uses dynamic spatial mapping algorithms to learn the Setting and environment and to plan a solution to navigate to its goal. The TSU may be one for cooling or for heating. The purpose of the TSU is determined by the type of material used in the thermal store. In an embodiment, a fan forces air over the heat transfer element in the TSU (this can be pipes of fluid embedded in the thermal storage material) and the conditioned air then flows to the target object to warm or cool the object. Alternately, the heat transfer element is simply exposed in a safe manner so that heat is gained or lost via radiation and passive convection.

The Control Unit (CU) has one or more devices such as sensors from the list of contemplate sensors described above, a processor-controlled tilt-swivel base to help position the CU to an area of interest, an infrared projector to project a pattern on the frame of view, to be captured by a digital camera with an infrared band-pass filter in front of the lens. Using algorithms of the processor, an infrared remote control receiver and hardware and software interface modules to read and/or control external systems, the 3D structure of the Setting and environment is determined. The CU further coordinates the workings of the system in conjunction with the environment and with any external systems. Other types of units, such as humidifiers or dehumidifiers can be interfaced to the system via controller boards. One of the main purposes of the CU is to map the 3D layout of the room and the items therein, including system units. The CU identifies objects needing heating (such as people) and in particular the areas of those objects that need heating (e.g. skin). This information is provided to selected devices which are determined to be the ones most suitable for temperature control of the desired person or object because of their positioning within the Setting.

The location of an object or person may be determined, for example, by scanning a morse code like visual code output from the CU while simultaneously shining a bright laser on the visual code as described in systems of the prior art to help in triangulation using trigonometric and/or heuristic means) or availability (via status updates over the network). For example, the radiant energy from the Haser may be directed as line-of-sight, meaning there must be a clear unobstructed path between the source and the target for the radiant energy to reach the target. If a part of the target is occluded, a second Haser may be used to target that area. Alternatively, a Rover can be sent towards the target to provide ambient warmth if that will better serve the goal. It is recommended that the CU is mounted or kept as high as possible—this provides a better bird's eye view, which makes for better utilization of the devices within the installation. In this example, the video streams from the CU, the two Hasers and the Rover are used to create a 3D map of the Setting. The Hasers slowly scanned over the Setting periodically to make temperature measurements using their pyrometers, to create a low-fidelity map of the hot and cold areas of the Setting. This information can be provided to the CU or to external auditors that can then determine further action (such as insulating those areas). The CU uses the 2D and 3D maps of the Setting to help guide the Rover to its destination.

The HotHead is a module comprising a heating element, at a minimum, optical elements that focus the electromagnetic radiation emitted by the heating element in as collimated a beam as possible (i.e. where the beam of radiation has little spread over a distance) and a band-stop filter that absorbs significant amounts of visible light and passes through other parts of the electromagnetic spectrum, especially infrared. This is to minimize discomfort to the eye. All types of heating elements for producing a highly focused (i.e. collimated) beam of EM radiation are contemplated, including the following. In the present invention, such a device is referred to as an Electromagnetic Radiation Unit ("EMU"). An EMU targets and heats only the desired areas, at a functional distance much longer than that provided by heaters available in the prior art with similar power consumption. The area of focus of the EMU is variable. In an embodiment of the present invention, the narrow beam of EM radiation diverges little even over distances of approximately 3 meters to 4.5 meters (10 feet to 15 feet) using 1000 W of power. This feature of the present invention is a significant improvement of existing portable heaters that use 1200 W to 1500 W and can reach a maximum distance of approximately 1.8 meters (6 feet), therefore in contrast to radiation from heating systems of the prior art this collimated beam is minimally affected by the inverse square law of physics. Thus significant parts of the EM generated by the EMU of the present invention reaches the target and in this way the module does not need to be in close proximity to the recipient.

A number of types of EMUs have been found to be effective and all are within the scope of the environment conditioning systems of the present invention. A "LASER-EMU" is type of EMU that has an infrared (IR) laser source in an assembly that scans the target object with a laser to direct the EM radiation to the target in a narrow beam. A "SPOT-EMU" is a type of EMU that uses a modified spotlight, again, to direct the EM radiation to the target in a narrow beam. A "WIRE-EMU" is a type of EMU that uses a high resistance material (such as but not limited to nichrome) in a structure designed to maximize the resistance of a given volume of material in as small space as possible, placed in optical elements to direct the EM radiation to the target in a narrow beam. An "IRLED-EMU" is a type of EMU that uses arrays of IR LEDs to produce heat and that are placed in optical elements or an array of optical elements to direct the EM radiation to the target in a narrow beam or narrow beams. A "MICRO-EMU" is a type of EMU that uses a microwave source placed in a waveguide to direct the EM radiation to the target in a narrow beam.

In an embodiment of the present invention, a LASER-EMU comprises a laser source, such as one or more laser diodes or laser diode bars, totaling between 40 to 60 W as net power output. An important feature, in the present invention, is the use of a combination of EM radiation at different wavelengths producing an optimal mix of those that are absorbed well by human tissue and those that produce a strong sensation of warmth, as described herein. In this embodiment, the LASER-EMU may produce wavelengths close to the 1,000 nm-1,400 nm range, such as using laser diodes and laser diode with coherent outputs at 808 nm and 980 nm outputs. The uniquely designed multiple "Laser Heads" of the present invention, working independently and together, are capable of reducing the intensity of the laser via direct diodes or beam splitters and then spreading the beam over a larger area, providing about 4 mW/cm2 irradiance (radiation flux per unit area), i.e. always less than the eye safety levels for Class IIIa (ANSI)/Class 3R (IEC) lasers. Lasers are inherently dangerous and particular care must be taken to ensure that the invention is eye safe. In the present invention prisms, lenses and mirrors may be used to achieve these effects. Each Laser Head also has a low-intensity Class II (ANSI)/Class 2 (IEC) laser referred to herein as a "LASER POINTER" that can be used to, on demand, highlight the areas being "painted" by the heating LASER-EMU (which itself is invisible). The LASER POINTER is also used to determine depth information from the camera's frame using basic trigonometry and triangulation. This visible laser is also used to identify regions of interest to the human user, such as areas of the room that are colder than others, which can indicate where better insulation may be required.

Laser safety is a priority, and therefore in the present invention, each Laser Head has two redundant built-in subsystems that check several times a second that the laser is indeed physically moving and scanning and that the irradiance falls within parameters. The subsystems in the present invention must both report success in order for the laser to continue scanning otherwise it is immediately shut down and the unit flashes the onboard LED to indicate an error code while simultaneously broadcasting the status on the network so that the other units can reconfigure themselves. The safety subsystems cannot have their software/controlling logic updated remotely without highly secure validations including the need for the user to be physically present near the unit. This is to avoid malicious targeting of the unit—safety is therefore very important.

The LASER-EMU also uses a proximity sensor which will shut off operation if objects come too close to it. A further safety feature is that no two beams may intersect either whether from one unit or from different units. This prevents a cumulative effect at any place in the field of operation which is higher than the safety level specified for the operation of any one laser head. Radiation levels are less than the MPE (maximum power exposure) limits of power density vs. exposure for all wavelengths used. A tip-over safety switch is also provided which turns off operation of the LASER-EMU if the unit is not in the vertical position, i.e. it tips over.

Optical elements of the LASER-EMU are used to collimate the laser light. Each Laser Head has optics that widens the laser within it to a larger, still collimated beam of lower irradiance. A combination of low-cost mirror galvanometers ("galvos") and a beam expander is used. The galvos are used to define the size of the coverage. The galvos also determine the shape of the area to be painted by the laser, which is generally circular or elliptical. First surface mirrors or front surface mirrors (also commonly abbreviated FS mirror) are used. These are mirrors where the reflective surface is above the backing as opposed to the conventional second surface mirrors where the reflective surface is behind a transparent substrate such as glass or acrylic.

A "SPOT-EMU" comprises a number of halogen bulbs (also called lamps) being used as heat sources. The SPOT HotHead in an embodiment of the present invention comprises a SPOT-EMU, set within optical elements to collimate the EM radiation produced. Halogen lamps produce significant amounts of infrared in addition to visible light and the infrared is sensed as heat by the human body. The power input to the lamp can be changed manually or under electronic control so as to produce more or less heat. Contemplated power ratings of halogen bulbs include 2000 W, 1500 W, 1000 W, 750 W, 500 W, 300 W and 250 W, among others. The optical elements of the SPOT-EMU contemplated within the present invention include parabolic reflectors, lenses and band-stop filters. The parabolic reflectors are made of materials highly reflective of radiation from the heating element, such as aluminium reflectors (good for both infrared and visible light), gold (absorbs more visible light than aluminium), silvered glass reflectors (less efficient than aluminium reflectors) and dichroic reflectors (selectively transmit, absorb and reflect different parts of the electromagnetic spectrum). Front-surface metal reflectors reflect more of the EM radiation than their silvered glass counterparts.

Lenses are made of materials highly transmissive of infrared radiation. They are of sizes and focal lengths such that much of the radiance of the heating element is transmitted in a collimated beam. The use of Fresnel lenses is preferred over regular lenses as the Fresnel lenses are lighter in weight and also transmit more of the radiation incident upon them. Band-stop filters that absorb significant amounts of visible light and let pass through other parts of the electromagnetic spectrum, especially infrared help to minimize discomfort to the eye. One embodiment of a filter is a Lexan filter, another embodiment is a set of multiple theatrical gels (such as Rosco filters) such that visible light is minimized and radiation that heats is maximized. An example of this would be two sheets of Rosco Fire red and two Congo blue. Another embodiment of a filter is a dichroic filter material such as that available at Edmund Scientific. These filters selectively reflect and pass through various wavelengths. A silicon wafer mirrored on both sides can also be used to remove all of the visible radiation—no visible radiation is detectable whereas IR radiation above roughly 1300 nm is passed through.

The collimation and direction of the beam may be changed by dynamically altering the location of the heating element within the coordinate systems of the optical elements. The optical elements are typically several times larger than the lamps. The location of the heating element can be dynamically changed within the local coordinate systems of the optical element(s) in order to alter the beam characteristics. Contemplated characteristics include beam shape (collimated, wider or narrower) and direction (on center, off center in a specific direction). The mechanism for moving the heating element may be manual or use electro-mechanical devices under electronic control.

In an embodiment of the present invention, a spotlight such as an AluPAR64 1000 W VNSP (Very Narrow SPotlight) lamp is used that has a parabolic reflector of 8" diameter made of aluminum at the focal point of which is placed a 1000 W halogen bulb. Any glass plate covering the front of the spotlight is removed as the plate itself absorbs some of the IR radiation from the lamp. A smaller parabolic reflector placed in front of the lamp reflects the spherical wavefront from the front of the bulb back towards the larger rear reflector to enhance the collimation of the waves. In a further embodiment, using a parabolic reflector similar to the one described above, one or more halogen lamps which are connected in series or parallel, each subjected to a voltage less than its rating are placed within the reflector. For example, a 1000 W 110V halogen bulb is provided 55V. This has the effect of producing less power, but a larger fraction of that power is in the infrared (IR) part of the EM spectrum, which is desirable for the present invention. Thus a lamp rated at 1000 W provides electricity at a lower voltage than its rating, if it were to produce 500 W and dissipates more of that power as infrared radiation than a lamp rated at 500 W at full voltage. Halogen lamps are quite bright and thus need a filter to cut out as much of the visible light as possible.

In a still further embodiment, a "WIRE-EMU" that uses a high resistance material (such as but not limited to nichrome) in a structure designed to maximize the resistance of a given volume of material in as small space as possible, is placed in optical elements to direct the EM radiation to the target in a narrow beam. Many structures are contemplated including a coiled coil. The "WIRE HotHead" comprises a Wire-EMU in a configuration similar to that of a SPOT-EMU, where the SPOT-EMU is replaced by a WIRE-EMU.

An "IRLED-EMU" has arrays of infrared (IR) LEDs. These LEDs are typically of higher power than those used as light indicators. Desired wavelengths contemplated include those in the 808 nm to 1400 nm range, which are commonly available, in addition to others emitting in the infrared spectrum. An "IRLED HotHead" is contemplated to comprise an IRLED-EMU where either each LED has its own optical elements for collimating the beam including a local reflector and/or lens, or the array of LEDs have a single larger reflector and/or lens. A "MICRO-EMU" is a type of EMU that uses a microwave source emitting at about 95 GHz placed in a waveguide to direct the EM radiation to the target in a narrow beam. This part of the EM spectrum, among others, produces the sensation of heat in the human body. A "MICRO HotHead" is contemplated to comprise a microwave source (considered a point source) such as a microwave gun, in front of which is a horn antenna (or "feedhorn") or a simple dipole antenna, in front of which is placed a lens antenna. The lens antenna collimates the spherically radiating microwave energy into a plane wave (in a given direction). One type of lens antenna is the waveguide type lens that comprises several parallel concave metallic strips which are placed parallel to the electric field of the radiated energy fed to the lens. Another type of lens antenna is a delay lens, which slows down the phase propagation (velocity) as the wave passes through the lens. The delay lens is convex and is constructed of dielectric material. The delay in the phase of the wave passing through the lens is determined by the DIELECTRIC CONSTANT (REFRACTIVE INDEX) of the material. Another type of lens antenna is a LOADED MICROWAVE LENS is a multi-cellular array of thousands of cells. Each cell contains a slow-wave (delayed), serrated-metal, plastic-supported waveguide element which acts as a phase-controlling device.

Another Heating or Cooling module contemplated within the scope of the present invention is the Thermal Store Unit (TSU) comprising the following elements: a heat store, a cold store, a heat exchanger, an external shell (or skin), a power source, and a fan. For a heat store, a thermal material with high thermal mass such as ceramic bricks or certain inorganic salt solutions or a combination thereof may be used. These materials have a very high capacity to store energy (Thermal Mass) because of their specific heat capacity (kJ/kg·K) and/or latent heat of fusion (kJ/kg). Note that different materials will be needed depending on whether the desired effect is heating or cooling. In further embodiments as described herein the purpose of the TSU is to provide heat. For a cold store, a thermal material such as water that has a high latent heat to switch from the solid (ice) to liquid states. This material is frozen so that the temperature differential between it and the ambient temperature causes heat transfer. The heat exchanger is used to warm or cool the thermal material. This is plugged into the power source. The external shell (or skin) creates an air space between the shell and the radiation apparatus of thermal material so as to provide a buffer from unwanted heat effects such as burns from direct contact. The power supply may be one or more rechargeable batteries for running its electronics and electrical devices. The fan can be used to dissipate the energy faster. The fan forces air over the heat exchanger elements for thermal store/air transfer. These elements may be different from those used to transfer heat between the TSU and the power source.

For a heat store, a high enough temperature must be achievable in the material such that the temperature differential between the TSU and the ambient temperature causes it to produce a large amount of heat over an extended period of time, such as a melting point of 180° F./82° C., which is the same temperature at which hydronic systems heat the circulating water. The TSU in the present invention will have LEDs that make it glow, the intensity of the glow indicating the thermal energy left in the unit before it gets too close to room temperature to be of use. A threshold level may be set so that when reached, the default operation is for the unit to go back to the charging station. Due to the type of materials used, the TSU may necessarily be a somewhat bulky object and can be mounted on wheels or on top of a mobility unit, such as a semi-autonomous robotic platform (RPU). A TSU is ideally suited to provide heat or to cool to one or two people. The unit may be of a round, square, or cylindrical shape to help with maneuvering around objects and corners. The unit may also be somewhat bottom-heavy, which lowers the centre of gravity making it less likely to tip over. An important feature of the unit is tip-over safety switch which turns off operation if the unit is not in the vertical position, i.e. it tips over.

Another type of module is a robotic platform unit (RPU) used for carrying a payload to a desired destination. The RPU module can return to a base station when issued a command to do so or when it needs to recharge its power source. The TSU is the typical payload for this device. Note that the TSU can be quite heavy (50-100 lbs), so the RPU includes motors with appropriate gearing and heavy-duty batteries, allowing it to carry a larger payload. The RPU may have three wheels of which two provide power and are connected to separate motors as s fairly standard for robot mobility platforms of the prior art. The RPU can turn in any direction making left or right turns when appropriate with the wheels rotating at different angular velocities to provide for the unit to make tight turns. The RPU can either go to a specified location as described herein or follow a weak radio transmitter which the person can keep on a keychain (a "beacon") to move the TSU into close proximity of the person. The RPU uses a combination of artificial neural networks (ANNs), randomness (deliberately inserted "noise") and heuristics (smart guesses) in its software to plan its movement based on its own sensors and on information provided via the network from the CU or from any of the other devices. The RPU is further provided with sensors from the list of sensors contemplated earlier in the document.

In the present invention, the Battery Unit (BU) provides extra batteries if a larger range of motion is needed. The BU articulates with the standard fittings on the RPU and the other units. Any of the described devices can be mounted on a wall or a stand with the exception of the RPU that is mobile and the docking station that is positioned on the floor for access by the RPU. A device may have appurtenances on the back of the unit for wall mounting along with a mounting bracket and/or on the bottom of the unit for mounting on a stand. The thermal stores do not have mounting brackets on the bottom because they are too heavy to mount on a stand safely. Devices may further have cushioned feet to protect a surface that the unit is placed on. The heating devices are also internally insulated to be cool to the touch and cooling devices are internally insulated to minimize condensation on the exterior and the interior. A stand that can be mounted on the RPU or the BU units by means of the articulating points standard to the units of this system. The EMU can be mounted on top of the stand. Power to the EMU is then routed via the stand.

A list of prior art follows, except for items which will be used by the current invention which are in the public domain—those will be enumerated in the summary of the invention. Microprocessor-based control systems or microcontrollers are widely available. A mobile thermal store design to store and spatially transfer heat to another location is known to exist under the name HAgent. There is some prior art for laser or microwave based heating systems including the ADS (Active Denial System) being used by US military and police. This uses directed microwaves in the 95 GHz range, which penetrates the surface of the skin and causes a sharp pain with no lasting effects. The Microsoft Kinect is a sensor unit used by the Microsoft Xbox gaming console which provides multiple sensory devices (camera & infrared camera, infrared projector).

It is an object of the present invention to provide a distributed, self-organizing environment conditioning system with adaptive and learning behaviors that provide localized and targeted climate conditioning.

It is a further object of the present invention that the system networks and controls various devices to monitor and control temperature and humidity in indoor and outdoor settings by efficiently tracking and targeting objects for selective environmental control.

The present invention is related to an extensible networked multi-modal autonomous environment conditioning system, comprising at least one control unit, at least one electromagnetic radiation unit, and wherein at least one control unit directs the electromagnetic radiation unit to a moving animate object and radiates the animate object only at a desired point of need area to selectively adjust the body temperature of the animate object. The extensible networked multi-modal autonomous environment conditioning system may further comprise at least one robotic platform unit, at least one thermal store unit, and at least one monitoring unit that tracks at least one of temperature, humidity, shade, air circulation, air quality and odors. The extensible networked multi-modal autonomous environment conditioning system may further include a rechargeable battery system. In the extensible networked multi-modal autonomous environment conditioning system at least one control unit may communicate with at least another control unit to self-organize, share information and enhance functionality over the environmental setting(s) of the control units. The shared information may be one of at least sensor data, list of capabilities, user preferences, historic environmental data and dynamically generated maps of the settings. The laser electromagnetic radiation unit of the extensible networked multi-modal autonomous environment conditioning system may be at least one of a laser electromagnetic radiation unit, a spot electromagnetic radiation unit, a wire electromagnetic radiation unit, an infrared light emitting diode electromagnetic radiation unit and a microwave source electromagnetic radiation unit. The extensible networked multi-modal autonomous environment conditioning system of claim 1 wherein the electromagnetic radiation unit radiates a target at a range of 3 meters to 4.5 meters (10 feet to 15 feet). In the extensible networked multi-modal autonomous environment conditioning system at least one control unit detects an animate object by tracking motion of the object through gestures.

The present invention is further related to a method of thermally conditioning an environment, comprising the steps of mapping a setting, detecting movement of an animate object through gestures within the setting, determining a point of need on the animate object, directing electromagnetic radiation to the point of need, adjusting the body temperature of the animate object based on sensing of environmental conditions. The method of thermally conditioning an environment may further comprise the step of moving the electromagnetic radiation source towards the animate object using a robotic platform unit. The method of thermally conditioning an environment of may also further comprise the step of moving a thermal store unit towards the animate object using a robotic platform unit. The method of thermally conditioning an environment of may also further comprise the step of monitoring one of at least temperature, humidity, shade, air circulation, air quality and odors.

The method of thermally conditioning an environment further comprises the step of recharging one of at least the electromagnetic radiation source and the robotic platform unit and the step of communicating with at least one control unit to self-organize, share information and enhance functionality over the environmental setting. The method of communicating shared information may include the step of communication one of at least sensor data, list of capabilities, user preferences, historic environmental data and dynamically generated maps of the settings. The method of thermally conditioning an environment further comprises the step of directing electromagnetic radiation to the point of need using one of at least a laser electromagnetic radiation unit, a spot electromagnetic radiation unit, a wire electromagnetic radiation unit, an infrared light emitting diode electromagnetic radiation unit and a microwave source electromagnetic radiation unit. The method of thermally conditioning an environment also further comprises the step of directing the electromagnetic radiation to a point of need that is at a distance from the electromagnetic radiation source in a range of 3 meters to 4.5 meters (10 feet to 15 feet). The method of thermally conditioning an environment also further comprises the step of reducing the intensity of the laser electromagnetic radiation unit using direct diodes and beam splitters and spreading the beam to maintain the beam at intensities within eye safety levels.

BRIEF DESCRIPTION OF THE DRAWINGS

Illustrative embodiments in accordance with aspects of the invention are described below in conjunction with the following drawings in which like numerals reference like elements and wherein:

FIG. 3 is a partial exploded view diagram of the exemplary embodiment of a Haser in the present invention shown in FIG. 2a, including a first exemplary embodiment of a Laser Source and its feeds to HotHeads comprising LASER-EMUs in the exemplary embodiment of the Haser in FIG. 2a;

FIG. 5 is a first exemplary embodiment in the present invention of a LASER-EMU, using a laser source, motors and mirrors that are non-orthogonal (i.e. not at right angles) to the motors. It is contemplated that among other possibilities, variations in the relative speeds, angles of mirrors to each other and the locations of the motors are used to change the shape and size of the drawn spirograph. The spirograph covers the approximate area that needs to be heated;

FIG. 5a is a second exemplary embodiment in the present invention of a LASER-EMU, using a laser source and galvanometers orthogonal to each other, with coaxial mirrors attached to the spindles of the motors;

FIG. 5b is a first exemplary embodiment in the present invention of a tilt-pan tray using servos, with two degrees of freedom;

FIG. 6a is a first exemplary embodiment of a parabolic reflector;

FIG. 6b is a cross-sectional view of the first exemplary embodiment of a parabolic reflector in FIG. 6a, with an infrared-pass filter;

FIG. 7a is a first exemplary embodiment of a WIRE HotHead comprising a parabolic reflector, a WIRE-EMU and an IR-pass filter;

FIG. 7b is a first exemplary embodiment of a scaffold for a high-resistance wire of the WIRE-EMU;

FIG. 8 is a first exemplary embodiment of an SPOT HotHead comprising a parabolic reflector, a SPOT-EMU and an IR-pass filter;

DETAILED DESCRIPTION OF THE DIAGRAMS

Reference will now be made to the figures where various structures will be provided with reference number designations. It is understood that the drawings are diagrammatic and schematic representations of possible embodiments of the invention, and are not intended to limit the scope of the present invention nor are they necessarily down to scale. Further, one skilled in the art will appreciate that terms such as top, bottom, lower and upper as used herein are merely words used to describe the accompanying figures and are not meant to limit the scope of the present invention in any way.

Figure 1A:
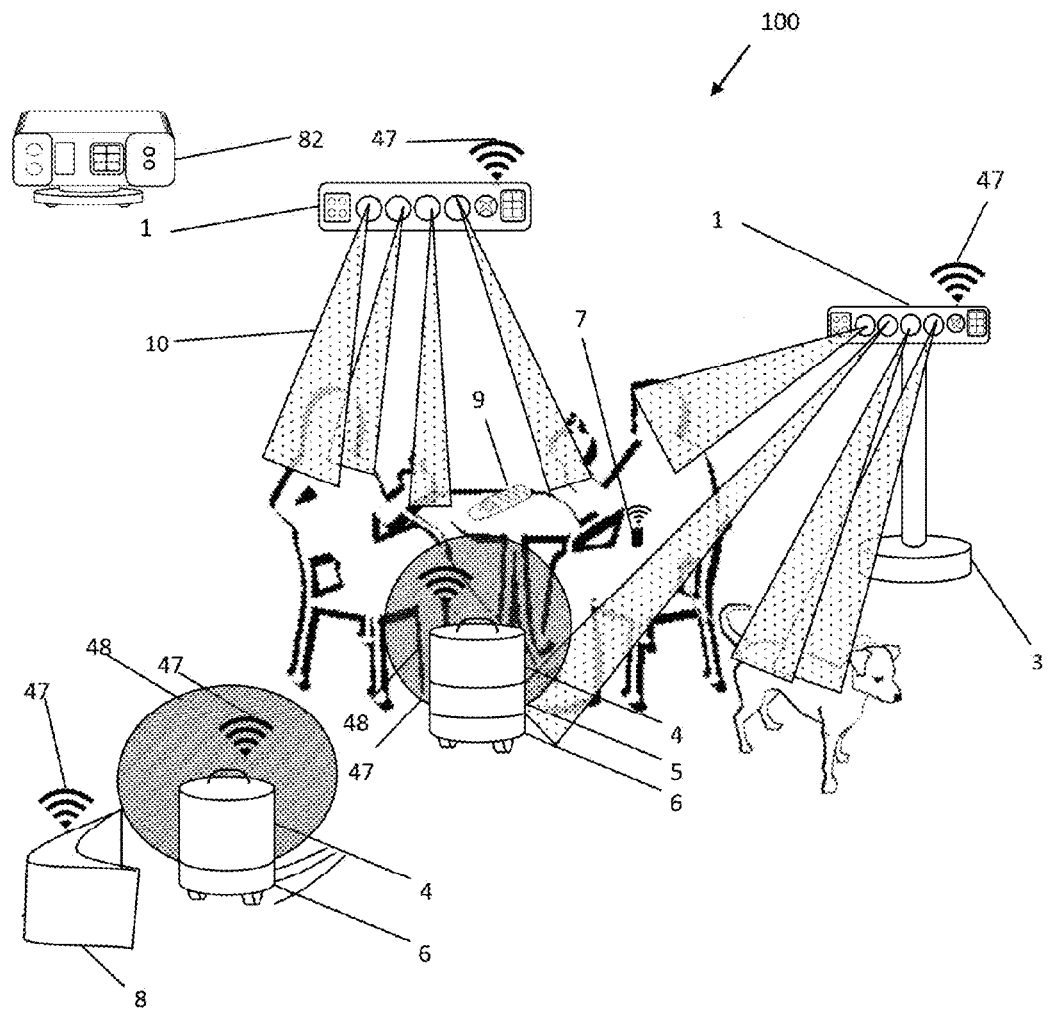
FIG. 1a is an illustration of a first exemplary embodiment of an installation of the present invention where sample embodiments of several devices of the invention, as described in the summary, are used to provide environmental conditioning by heating three occupants of a room, dynamically solving several times a second for an optimal solution in using the devices.

Items in the diagrams are referenced by the following numbers, which are consistent in indicating the same or same type of item across the diagrams.
1. EMU, first embodiment
2. Laser beam (collimated rays)
3. Stand with collapsible column
4. Thermal Storage Unit (TSU)
5. Battery Unit (BU)
6. Robot Platform Unit (RPU)
7. Tracker, sending out homing beacon
8. Base station/charger
9. Remote control
10. Sweep of the laser heads
11. Power supply
12. EMU control panel
13. Exhaust fan
14. Laser head
15. Sensor bay
16. Microphone
17. Camera
18. Infrared remote receiver
19. Temperature sensor (pyrometer)
20. EMU, second embodiment
21. EMU, first embodiment, back, bottom and side covers
22. Wall-mounting holes
23. Air intake
24. Wireless network antenna
25. EMU, first embodiment, front panel
26. Control cable, main wiring harness
27. Microcontroller board
28. Control cable for galvos and laser outputs
29. Laser module cable
30. Laser source
31. High power Optic fiber
32. Laser cavity
33. Galvanometer ("galvo") assembly
34. Servo assembly X (horizontal)
35. Servo assembly Y (vertical)
36. Laser head cover glass
37. Non-orthogonal mirror
38. Spirograph drawn by galvo assembly
39. Motor
40. Mirror
41. Parabolic reflector
42. Section through parabolic reflector
43. Visible light band-stop filter or infrared band-pass filter.
44. Heat-resistant board
45. Structure of high-resistance wire
46. Galvanometer motor (galvo)
47. Wireless signal
48. Radiation (heat) from the TSU
49. 3 articulation points for power and communication arranged in a triangle. This design is standard for all the units in the system so that they are stackable and they self-configure when stacked.
50. Handle for transport, folds into recess in the enclosure (not shown)
51. Glow LEDs
52. Convection fan
53. Power button
54. Thermal mass/PCM with heat transfer element
55. Access panel
56. Halogen lamp
57. Big wheel of the RPU
58. Little wheel of the RPU
59. Distance sensor
60. Camera
61. Pedestal
62. Infrared & Laser Remote control
63. Left button
64. Middle button: cycle: voice on/off, learn on/off
65. Human figure for scale comparison
66. Up button
67. Right button
68. Down button
69. IR diode
70. Laser diode
71. Power button
72. Device select button
73. Illuminate button
74. Defaults button
75. Return to charge button
76. Unused button
77. "−" button, remove region
78. Temperature select mode (then use +/−)
79. "+" button, add region
80. Speaker
81. Control panel
82. Control Unit (CU)
83. Motorized tilt/swivel stand
84. Plane wavefront
85. Direction of plane wave travel
86. Metallic medium
87. Air medium
88. Radial sections (rays)
89. Radiation source
90. Spherical wavefront
91. Collimating metallic strip
92. Exit side
93. Dielectric Lens
94. Energy Source Feedhorn FIG. 1 illustrates an example installation of the extensible networked multi-modal environment conditioning system 100 where various units of the present invention are used in conjunction with each other to heat the occupants of the room, a man, a woman and a dog. The devices work in concert with each other—note that a HotHead from a Haser 1 provides heat to the woman and partially to the man while another HotHead from another Haser 1 provides heat to him and the dog, while a thermal unit (TSU) 4 heats their feet. This TSU has an extra battery pack (BU) 5. Note that all the units in the present invention are stackable. The Robotic Platform Unit (RPU) 6 has articulating facets on its top (there can be none at the bottom as it has wheels). The TSU 4 and BU 5 have articulating facets at both the top and the bottom to provide for stacking of the devices in any configuration. The Haser 1 and Control Unit (CU) 82 have articulating facets only at the bottom. The stand 3 has articulating facets at the top and at the bottom as it can carry a Haser or CU. The stand has special molding on top to ensure that only Hasers 1 and CUs 82 can be attached.

In the present invention, the TSU 4 glows red when it is hot and this changes to a lighter pink as the heat fades away. The control software provides for the TSU 4 to automatically go back to the docking station 8 for charging where in a first embodiment a partner TSU 4 leaves the station 8 and goes to the point of need (PON) providing radiant heat 48. The control software can also provide either for the TSU 4 using the RPU to go to a specified location as described herein or follow a weak radio transmitter or beacon 7 which the person can keep on a keychain to move the TSU 4 into close proximity of the person. The charger at the docking station charges the batteries in all the devices in the stack on the RPU. It also heats the thermal masses in the TSUs in the stack. The charger 8 delivers enough power such that this power is more than the energy dissipation rate of the TSU 4 when it is in heat transfer mode at the point of use.

Devices environment conditioning system 100 can communicate via a network if thus enabled—over a wire or wirelessly. In the present figure, all devices have wireless networking 47. The CU 82 and Hasers 1 have most of the sensors and processors and together exhibit distributed intelligence in how to best use the resources available to address the environmental conditioning requirements of the Setting. The remote control 9 in the present invention can be used to provide directives to the system 100 such as powering it up or down, selecting a device to communicate with (each device will emit a beep and flicker—lights rapidly to indicate that it is the one the user will be communicating with). The remote control 9 also has a built-in laser pointer which can be used to highlight an area that the system should be heating or to subtract an area from the map of what can be heated. Pointing the laser on the remote control 9 at a device also selects that device in particular to respond to the remote control 9. Hasers 1 also include a laser pointer in the form of a low-power visible laser that can be turned on to highlight, among other objects, cold areas of the Setting or places frequented by people. The temperature sensor(s) on the devices, are swept all over the room to create a low resolution thermal map (typically distance to diameter, D/S, ratio of 10:1) of the objects in it.

The custom microcontrollers in the extensible networked multi-modal environment conditioning system 100 of the present invention continuously perform image processing many times a second to determine what to heat and when. All the software is modifiable and thus the system can get smarter as enhancements are made by a manufacturer and/or by the user community at large. The software takes advantage of behavior patterns of humans and other animals, for example, a person does and cannot stop moving immediately. A slow down must happen and a person or animal usually does not move spatially very rapidly in an indoor environment (unless dancing). There are typical strata above the floor that parts of our body occupy, such as the position of the head while lying down, the position of the head and hands while sitting on a sofa or a chair, and the position of the feet, hands and legs while standing. The conditioning system's 100 computer vision software is augmented with this behavioral knowledge.

Figure 1B:
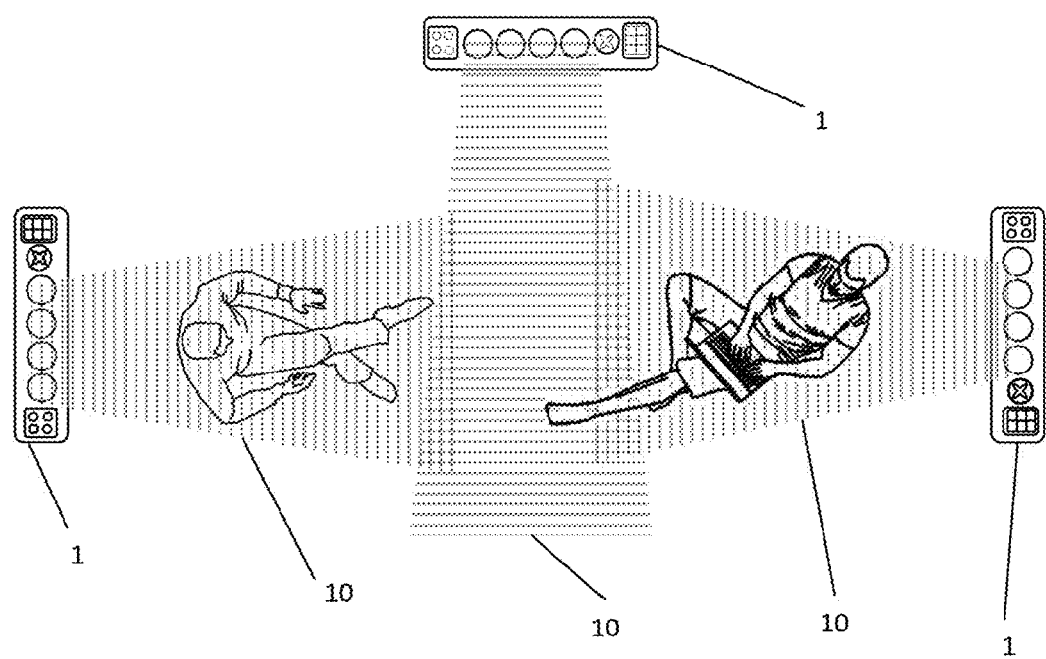
FIG. 1b is a top view diagram of a second exemplary embodiment in the present invention of a setup with sample embodiments of several devices of the invention, as described in the summary, showing illustrative regions of coverage of the area for providing environmental conditioning by coordinating and heating two exemplary occupants of a room, dynamically solving several times a second for an optimal solution in using the devices.

In the present invention as shown in FIG. 1*b*, a Haser 1 can heat only what is available in the line of sight. To alleviate this, multiple Hasers 1 may be installed in an environment such that they provide a continuous range of coverage 10. Note that the areas of coverage are representative of the entire sweep of all HotHeads and it is not to be understood that the entire range is always covered by them.

Figure 2A:
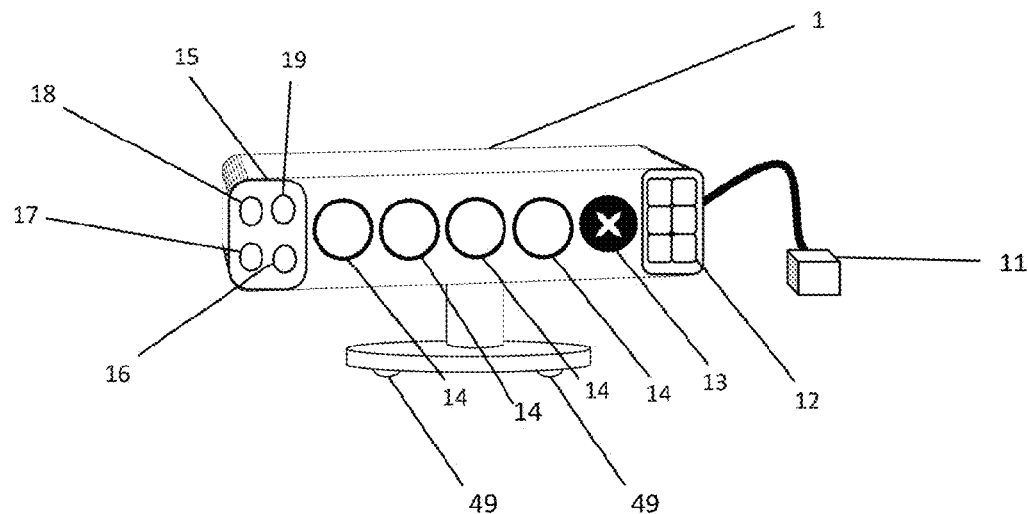
FIG. 2a is a perspective view diagram in the present invention of a first exemplary embodiment of a Haser, as described in the summary, with multiple HotHeads.

In the present invention as shown in FIG. 2*a*, a first embodiment of a Haser 1 is shown. It has a control panel 12, which has some features available, though the entire feature set may only be available via the remote control or via a control panel on a computer where a program may be used to interact with the Haser 1 via a wired or wireless network. Such a program may be an internet (web-based) application. The Haser 1 is connected to electric power using a power supply 11 that may be compatible with any electrical power source the device having the capability for example to operate with either 110V or 220V electric mains. A fan 13 provides exhaust for the heat generated in the unit which also results in heating the Setting—so nothing goes to waste. The Haser 1 may have one or multiple HotHeads 14, especially designed for this invention. HotHeads 14 can be implemented with various technologies, some of which are described herein. In this embodiment, there are four HotHeads 14 each of which may work independently of one another and be independently positioned with respect to the others so that one or all of the HotHeads may focus on one person or on several people, depending on the conditioning requirements and number of persons or animate objects within the Setting. The sensor panel 15 contains a microphone 16, camera 17, infrared remote receiver 18 and temperature sensor (pyrometer) 19. These sensors are used to respond to spoken commands, determine the 3D layout of the room and its occupants, and to accept commands via an infrared remote control 9.

Figure 2B:
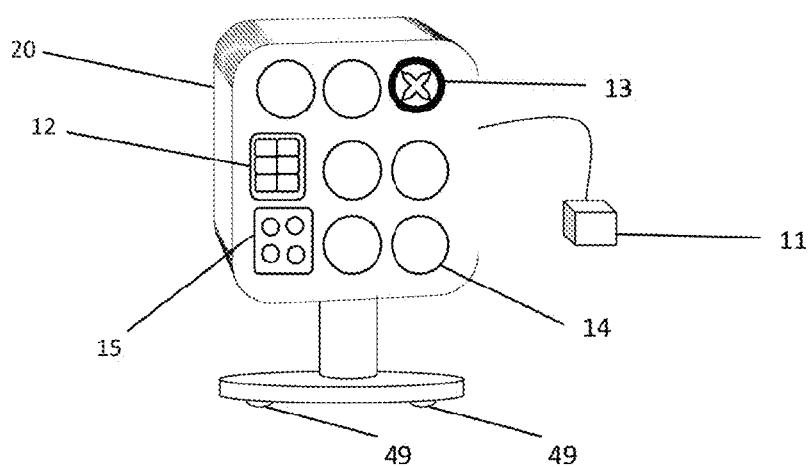
FIG. 2b is a perspective view diagram of a second exemplary embodiment of a Haser with multiple HotHeads.

In the present invention, in FIG. 2*b*, an alternative embodiment of a Haser 20 is shown, which has an alternate layout of the components and six instead of the four HotHeads in FIG. 2*a*, thus with the ability to deliver more power. Note that the fan in both the embodiments FIG. 2*a* and FIG. 2*b* is placed on the opposite side (and above) the temperature sensor 18 so as not to create errors in readings. Articulation points 49 for stacking of the Haser are also shown.

Figure 3:
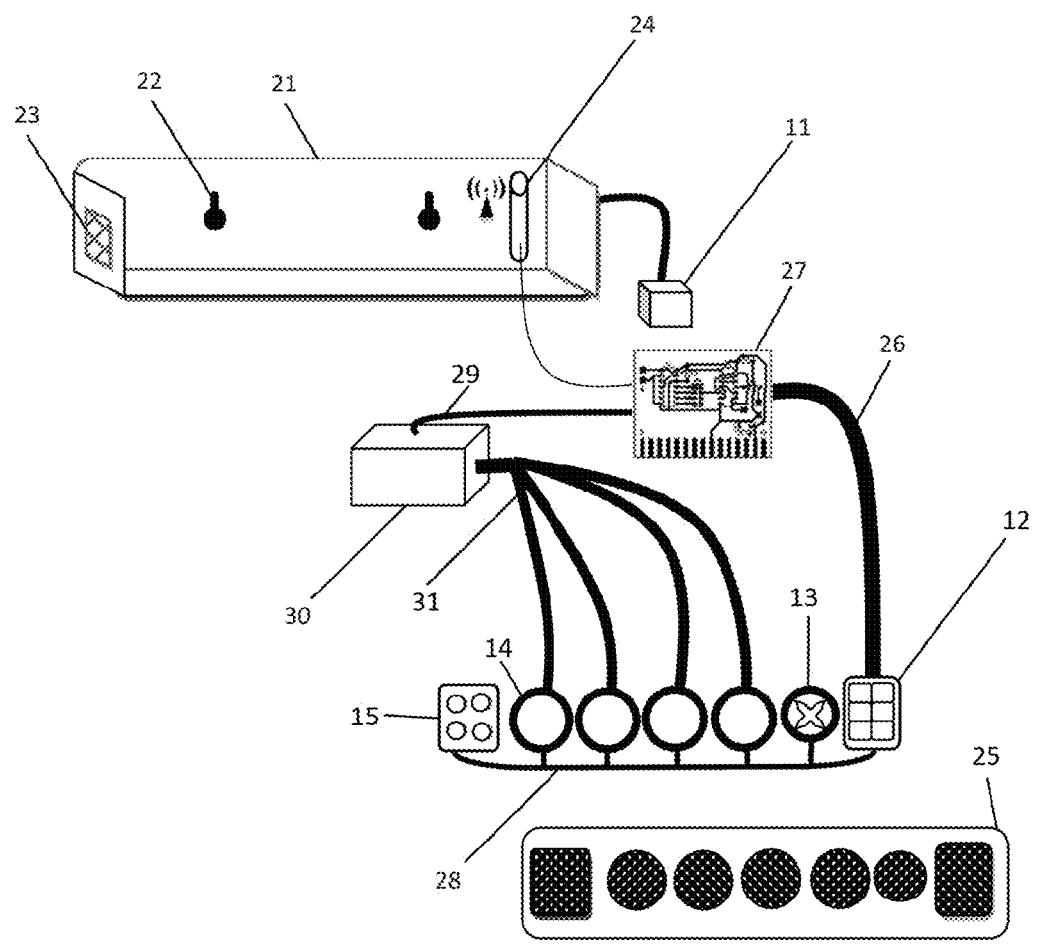

In the present invention, in FIG. 3, an exploded view of Haser 1 from FIG. 2*a* is shown. A power supply 11 is connected to the device. The back, sides and bottom of the device are assembled in one piece 21. The top of the unit is not shown and is distinct from the front face 25. The device can be hung from a wall using the holes 22. The left side of the unit, when looking at it from the front, has an air intake 23 to keep cool, fresh air flowing through the system and maintaining its internal temperature. A wireless network antenna 24 may also be provided. The microcontroller board 27 is connected via a wiring harness 26 to the control panel 12, an additional wiring harness 28 continues and provides power and signals to fan 13, the HotHeads 14 and the sensor array 15.

In this particular embodiment, LASER HotHeads are used. SPOT HotHeads, WIRE HotHeads and others can also be used. The controller 27 is also connected to the laser source 30 which may be a laser diode bank with beam splitters, which then feeds the lasers to the HotHeads 14 via fiber optic cables 31. The power and other controls for the laser source are delivered via cable 29.

Figure 4:
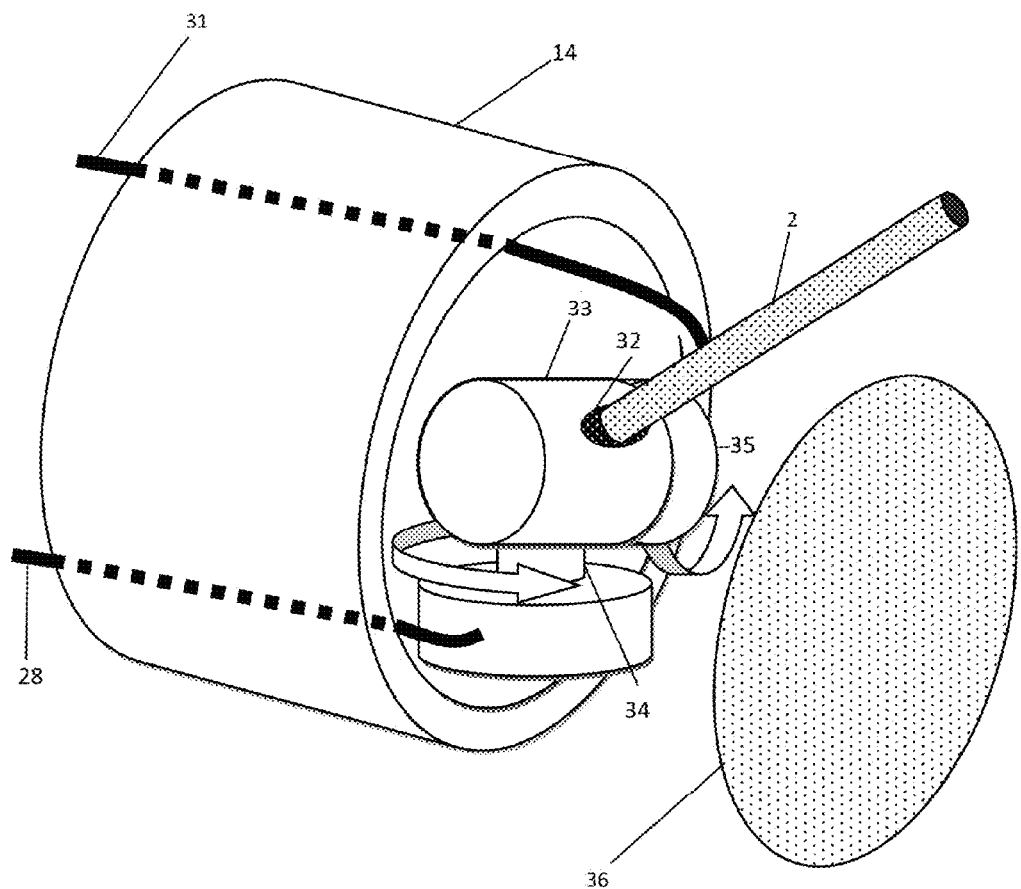
FIG. 4 is an exploded view diagram of a first exemplary embodiment of a HotHead using a LASER-EMU, mounted on a tilt-pan tray.

In the present invention, in FIG. 4, the LASER HotHead 14 houses an articulated 2-degree of freedom dual servo motor system 34, 35 that is used to position the galvanometer box (galvo box) 33 so that it can "paint" a medium sized area with the laser beam 2. These servos motors 34, 35 move relatively slowly in comparison to those inside the galvo assembly 33. The design of this component of the invention takes advantage of cheaper components and is similar in articulated control as for example an arm where the shoulder and the elbow are used for gross motion and the hand is used for faster, more nimble tasks. The servos motors 34 and 35 spin orthogonally to each other. The galvo box 33 has a laser cavity 32 through which the laser beam 2 exits. The laser source 30 is provided via a lightweight optic fibre 31 and the power and control information is provided by the bus wires 28. The front of the Laser EMU is covered by a glass 36 that is transparent to infrared radiation.

FIG. 5 is a first exemplary embodiment in the present invention of a LASER-EMU, using a laser source 30 to project a laser beam 2 towards mirrors 37 mounted on motors 39. The mirrors are non-orthogonal (i.e. not at right angles) to the motors. It is contemplated that among other possibilities, variations in the relative speeds, angles of mirrors to each other and the locations of the motors are used to change the shape and size of the drawn spirograph 38. The spirograph 38 covers the approximate area that needs to be heated.

FIG. 5a is a second exemplary embodiment in the present invention of a LASER-EMU, using a laser source 30 to project a laser 2 on a mirror 40 coaxially attached to the spindle of a galvanometer motor 46. The laser is reflected onto the other mirror 40, attached, again, coaxially to the spindle of a galvo 46. This second galvo 46 is positioned orthogonally to the first galvo 46. FIG. 5b is a first exemplary embodiment in the present invention of a tilt-pan tray using servos 34 and 35, exhibiting two degrees of freedom to tilt and direct a laser beam 2 or other electromagnetic radiation unit (EMU).

A first exemplary embodiment of a parabolic reflector 41 denoting a cross-section 42 is shown in FIG. 6a. The cross-sectional view is shown in FIG. 6b, with an infrared-pass filter 43. A first exemplary embodiment of a WIRE HotHead comprising a parabolic reflector 41 is shown in FIG. 7a. In this first embodiment, the WIRE-EMU has a high-resistance wire 45 structured on a heat-resistant scaffold 44 and an IR-pass filter 43. Many high-resistance wires are contemplated within the scope of the present invention including nichrome. Several structures are contemplated for the high-resistance wire, including the coiled coil shown in FIG. 7a. Several heat-resistant materials, including mica, are considered, to build the scaffold 44 shown in FIG. 7b for the high-resistance wire. Many scaffold shapes are considered, including radially symmetrical shapes, i.e. rectangles (shown), extruded crosses (shown) and other n-pointed star shapes. FIG. 8 is a first exemplary embodiment of a SPOT HotHead comprising a parabolic reflector 41, a SPOT-EMU and an IR-pass filter 43. A first exemplary embodiment of a SPOT-EMU, shown here, is a high-wattage (e.g. 300 W-1000 W) halogen lamp (bulb) 56. Most of the energy from the lamp is emitted as IR light and thus is felt as heat.

Figure 9:
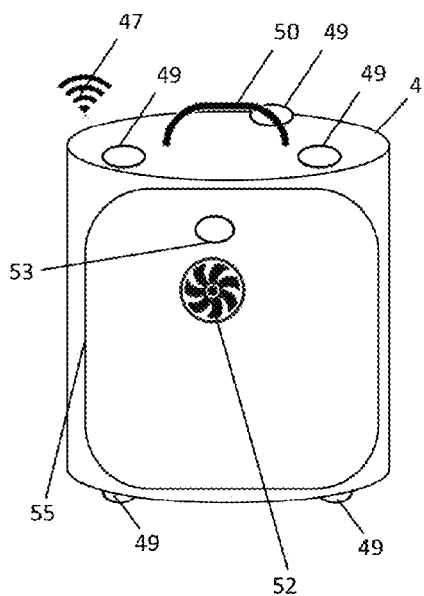
FIG. 9 is perspective view diagram of a first exemplary embodiment in the present invention of a Thermal Storage Unit (TSU)
Figure 10:
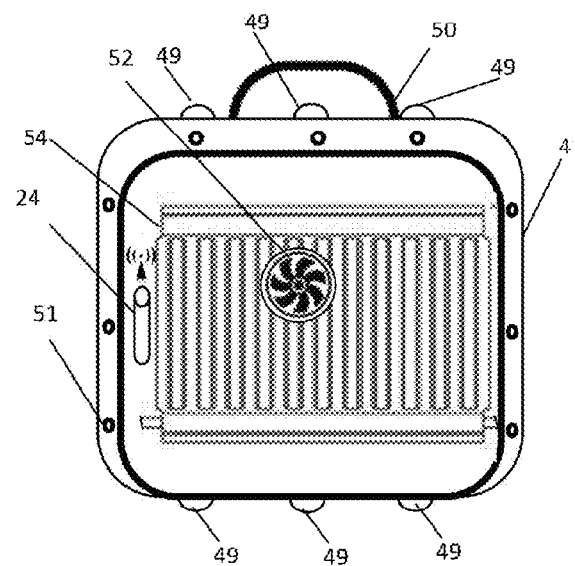
FIG. 10 is the exemplary embodiment in the present invention of the TSU in FIG. 9 with its service panel removed.

In the present invention as shown in FIG. 9, an embodiment of a Thermal Storage Unit (TSU) 4 with a switch 53 that turns the unit on or off is shown. The TSU 4 automatically coordinates with any other devices in the area via its wireless network interface 47 to perform its heating function. To this end, it uses the fan 52 to optionally drive air through the heated thermal mass and/or PCM (phase change materials) 54 within it as shown in FIG. 10. The TSU 4 has articulation points 49, a set of three on a surface, which can be used to put the unit 4 in a stack of RPUs 6 and BUs 5. A handle 50 is provided which can be used to transport the TSU 4 from one location to another. The handle 50 folds down when not needed or when the TSU 4 needs to be stacked and have another device (e.g. another TSU) placed on top of the unit 4. The TSU 4 has a service panel 55 which is removed to perform maintenance on the device.

In the present invention as shown in FIG. 10, LEDs 51 light up when the unit is in service and the strength of the glow indicates the thermal energy left in the thermal mass/PCM 54 inside the unit 4. The TSU 4 uses the antenna 24 to communicate with other devices in the area. The fan 52 is used to optionally drive air out of the system into the room in order to control the heat within an area such as to provide for an area to be heated more quickly. The articulation points 49 are used when stacking devices one on top of the other these points 49 provide both power and communication pathways. The handle 50 may fold into the body of the TSU when not in use.

Figure 11:
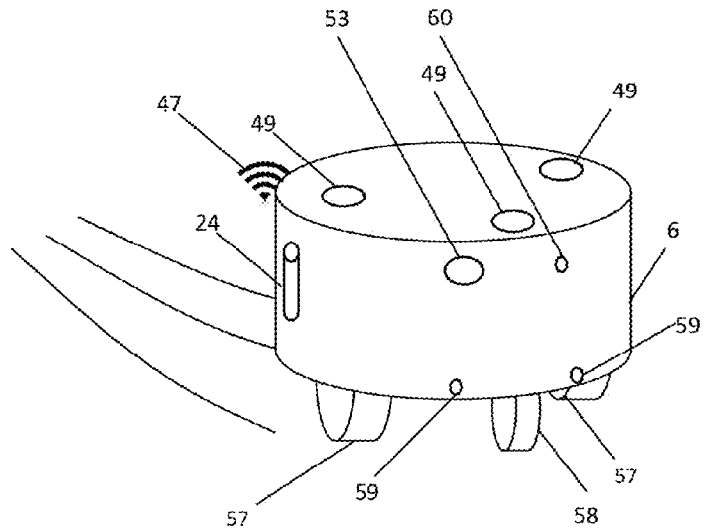
FIG. 11 is a perspective view diagram of an exemplary embodiment in the present invention of a Robotic Platform Unit (RPU)

In the present invention, as shown in FIG. 11, an exemplary embodiment of a Robotic Platform Unit (RPU) 6 has an antenna 24 that is used to communicate with other devices wirelessly 47. The RPU 6 is positioned at the bottom part of a physical stack of devices and has articulation points 49 for other devices such as BUs, TSUs and CUs and Hasers to be placed on top to provide mobility to the devices. The articulation points 49 automatically provide power and communication between the devices as necessary. The RPU 6 can be manually turned on or off with the power button 53. If the unit 6 receives no directive from any other devices (e.g. a statically mounted CU 82 or Haser 1 elsewhere in the Setting) or a remote control 9 (via remote receiver, not shown), and if it has a payload such as a TSU or Haser, it will do image processing to attempt to identify animate objects such as people or animals in the vicinity and go to the closest one found. Distance and cliff sensors 59 are provided for navigation and to prevent the RPU 6 from falling down stairs. A camera 60 is placed as high in the unit as possible to improve computer vision. The RPU may have two powered wheels 57, each run by an independent servo motors or other motor systems to adequately maneuver the device in and around obstacles within a Setting. In a first embodiment the independent servos are made to run at different speeds to provide for the robot turn within a small turning radius to avoid obstacles. A smaller wheel 58 in the front that is unpowered may be provided. The support structure of the base and wheels of the RPU 6 is designed to be able to carry large weights such as a battery pack of about 12V at 18 Ah and other devices within the conditioning system 100. The RPU 6 is designed for short runs within the Setting while carrying heavy loads where these runs may not include extensive movements. The control software may include a time lag between the moment motion of an animate object is detected and a command for movement is sent to the RPU 6 using for example a timer or a low-pass filter. This delay eliminates constant shuffling movement of a device in a case where a person or other animate object moves around frequently. This controlled movement assists in preventing a TSU 4 or other device from getting in the way of a person frequently moving within a Setting doing what he or she needs to do.

Figure 12:
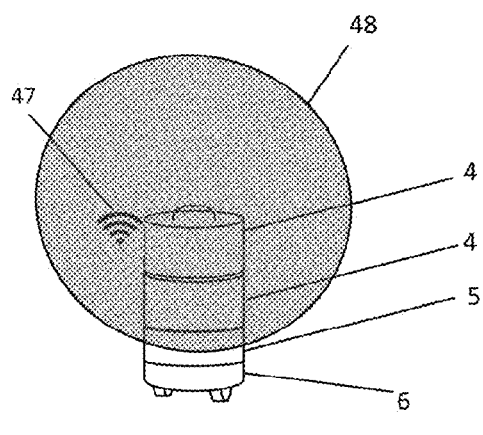
FIG. 12 is a perspective view of an exemplary embodiment in the present invention of a possible configuration of a Robotic Platform (RPU), an additional Battery Unit (BU) and two Thermal Storage Units (TSUs)

In the present invention as shown in FIG. 12, a sample stack 101 of two TSUs 4, a battery unit BU 5 and an RPU 6 is shown. In this stacked formation the system 101 is able to provide more thermal energy 48 than a single TSU 4, which is an advantage of the field-configurable nature of the system. While the RPU 6 may have its own battery pack, the BU 5 may provide additional power for the RPU 6 to compensate for the additional weight of the second TSU 4.

Figure 13:
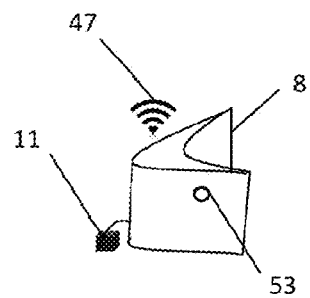
FIG. 13 is a perspective view diagram of an exemplary embodiment in the present invention of a Docking and Charging station.

In the present invention as shown in FIG. 13, an exemplary embodiment of a docking and charging station 8 that uses a power supply 11 to charge an RPU 6, TSU 4 or BU 5 is shown. For example, if an RPU 6 with a TSU 4 stacked on top is at the docking station 8, the battery of the RPU 6 will be charged and the TSU 4 will be heated or chilled, as per its function. The docking station 8 also communicates wirelessly 47 with other devices and has a button 53 to turn on or to stop charging. The docking station 8 automatically determines the type of unit that is charging and provides the adequate power requirements for that specific device. Charging requirements at docking points on the station may provide the appropriate high voltage power after communicating with a microcontroller in the TSU 4, BU 5 or RPU 6.

Figure 14:
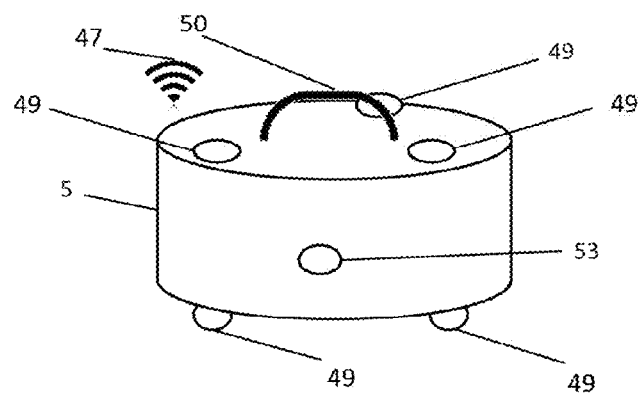
FIG. 14 is a perspective view diagram of an exemplary embodiment of a Battery Unit (BU)

In the present invention as shown in FIG. 14, an exemplary embodiment of a battery unit (BU) 5 has a power switch 53 that makes it active or inactive, and articulation points 49 to place it in a stack of other units. These connection points 49 provide power to the other units and also provide communication between the different units. The BU may also communicate current status and health wirelessly 47 through its microcontroller (not shown). The BU 5 may have a handle 50 for carrying, and this handle 50 can fit into a recess when the BU 5 is stacked with other devices.

Figure 15:
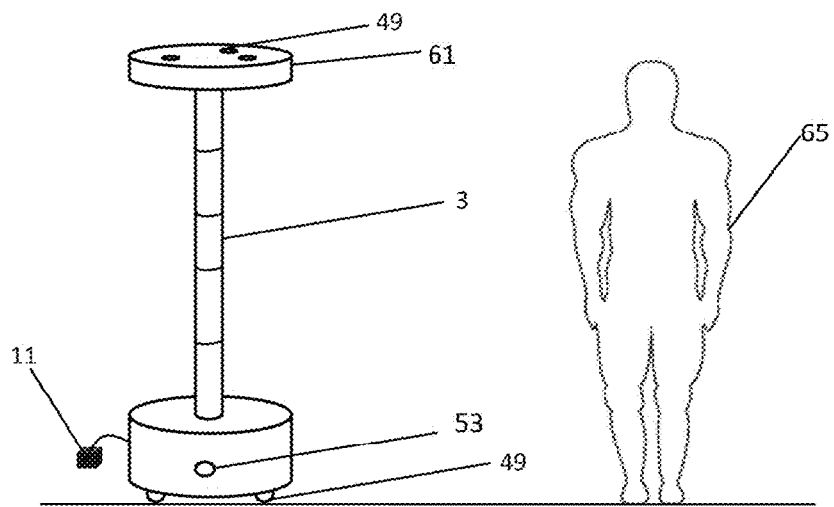
FIG. 15 is a perspective view diagram of an exemplary embodiment in the present invention of a specifically designed collapsible Stand that can be set at multiple heights.

In the present invention as shown in FIG. 15, a collapsible stand 3 for the use of mounting and supporting a Haser 1 or other device has a power button 53 and articulation points 49 on both the top and at the bottom for flexible stacking configurations. In the fully extended mode the stand may be of a height of an adult human 65 or in a range of approximately 1 to 2.5 meters to properly direct radiant heat from the system 100. The stand 3 also has a socket for plugging in a power supply (not shown). The stand 3 may be used to support a device such as a Haser 1 or CU 82 that may be mounted on an RPU 6 with for example a BU 5 or TSU 4 to provide mobility and a higher vantage point. This is an attractive solution to the gas-fired outdoor heaters used in restaurants as devices in the present invention make less noise and produce no unpleasant odors.

Figure 16:
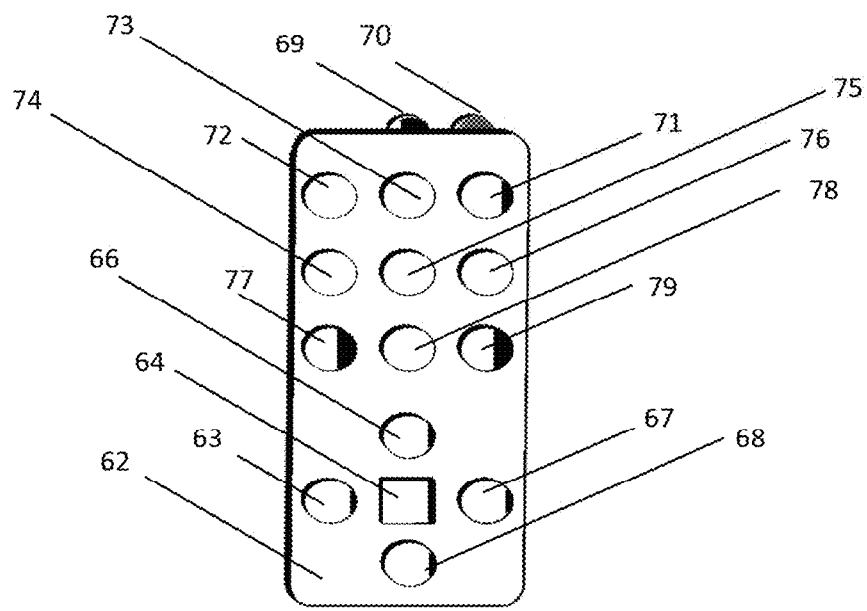
FIG. 16 is a top view diagram of an exemplary embodiment in the present invention of a Remote Control (RC) with functions particular to the invention.

In the present invention as shown in FIG. 16, an exemplary embodiment of a remote control (RC) 62 is shown. The remote control 9 has a number of control actuators or buttons to set commands, control voice on and off or set learning modes for example with a left button 63 may be used to position a TSU 4 at a point of need (PON), a middle button may turn on a learn mode to have the conditioning system 100 remember a temperature setting or location within a Setting 64, an Up button 66 and a Down button 68 may function to raise or lower a stand 3 with a Haser 1 or other devices supported on the stand 3, a Right button 67 may control movement and direction of one or more HotHeads, an infrared (IR) diode 69 may send commands to the CU 82, a laser diode 70 may be used to highlight regions that the user wishes to add or remove from the heating plan, a power button 71 may power on and off one device or by pressing it rapidly three times for example the button 71 may shut the entire system down, a Device Select button 72 may direct a command at a device, an illuminate button 73 may be used so that visible lasers can be turned on to show the areas being heated, the warmest areas and/or the coldest areas of the room or Setting where this information may be used to plan for insulation or other modification within the Setting. The remote 9 may also include a Default button 74 that will reset the current device to its default settings. Pressing this button 71 for example three times rapidly may set the entire system 100 to its default settings. The existing learned settings may not be destroyed but may be kept in memory to be retrieved and reused via the remote 9 or a web interface to the system 100 which is accessible via the wireless network. The "return to charge" button 75 will return the TSU 4 on an RPU 6 with the weakest charge to the charging station. The "−" button 77 and the "+" button, 79 may be used for minimal adjustments to target the system 100 to the proper environmental conditions and/or may be used for a variety of other fine tuning adjustments. For example, the temperature mode button 78 may be pressed before using the "+" and "−" buttons to adjust for the optimal personal temperature. The remote 9 may also include other feature and controls to monitor and adjust the environment conditioning system 100 to optimal conditions for the Setting and persons within the Setting.

Figure 17:
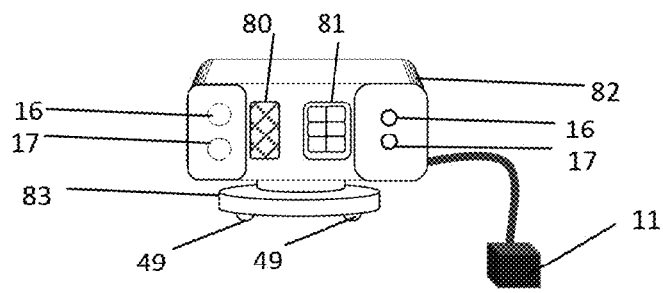
FIG. 17 is a front view diagram of an exemplary embodiment in the present invention of a Controller Unit (CU)

In the present invention as shown in FIG. 17, an exemplary embodiment of a Control Unit (CU) 82 is shown. The CU 82 has a power supply 11, a tilt/swivel base 83 that is used to position the unit to view an area of interest, articulation points 49 to provide alternate power, communication and signaling, cameras 17 and microphones 16 for stereoscopic visual and stereo aural perception respectively, a speaker 80 for verbal communication back to the user and additional communication ports for the connection of input/output devices such as an infrared projector for fast 3D layout calculations. The CU 82 has a control panel 81 that though use of the remote control 9 or gesturing towards the camera 17 provides for manual control and communication if desired.

Figure 18:
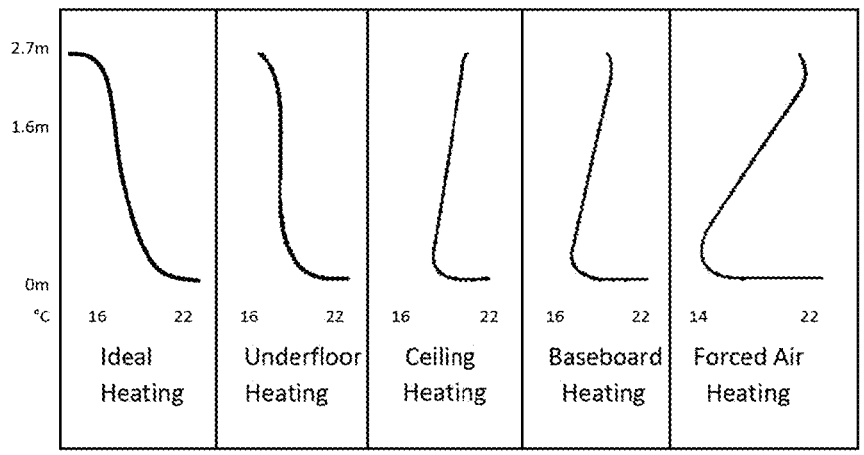
FIG. 18 is a chart showing a comparison of temperature profiles for various existing heating solutions.
Figures 19, 20:
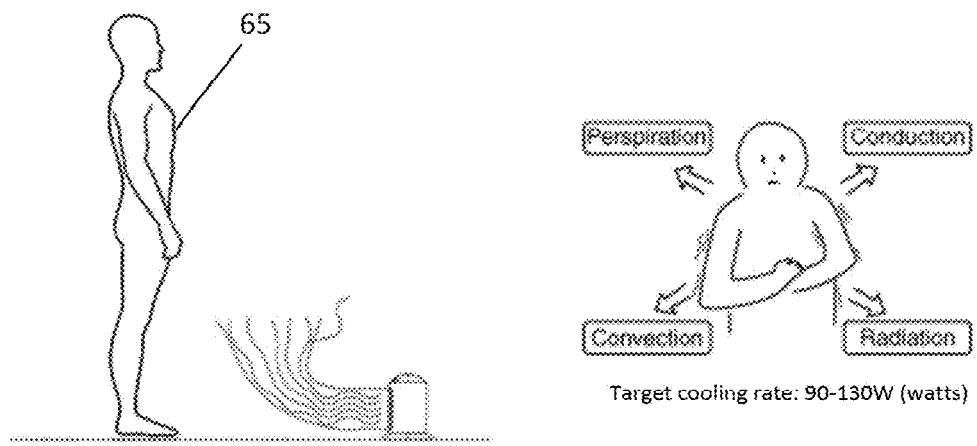
FIG. 19 is a diagram illustrating the air flow and effective distance for a generic portable heater of the prior art with air forced over a hot ceramic element.
FIG. 20 is a diagram of modes of heat loss and gain from the human body where 75% of the loss and gain is through radiation.
Figure 21:
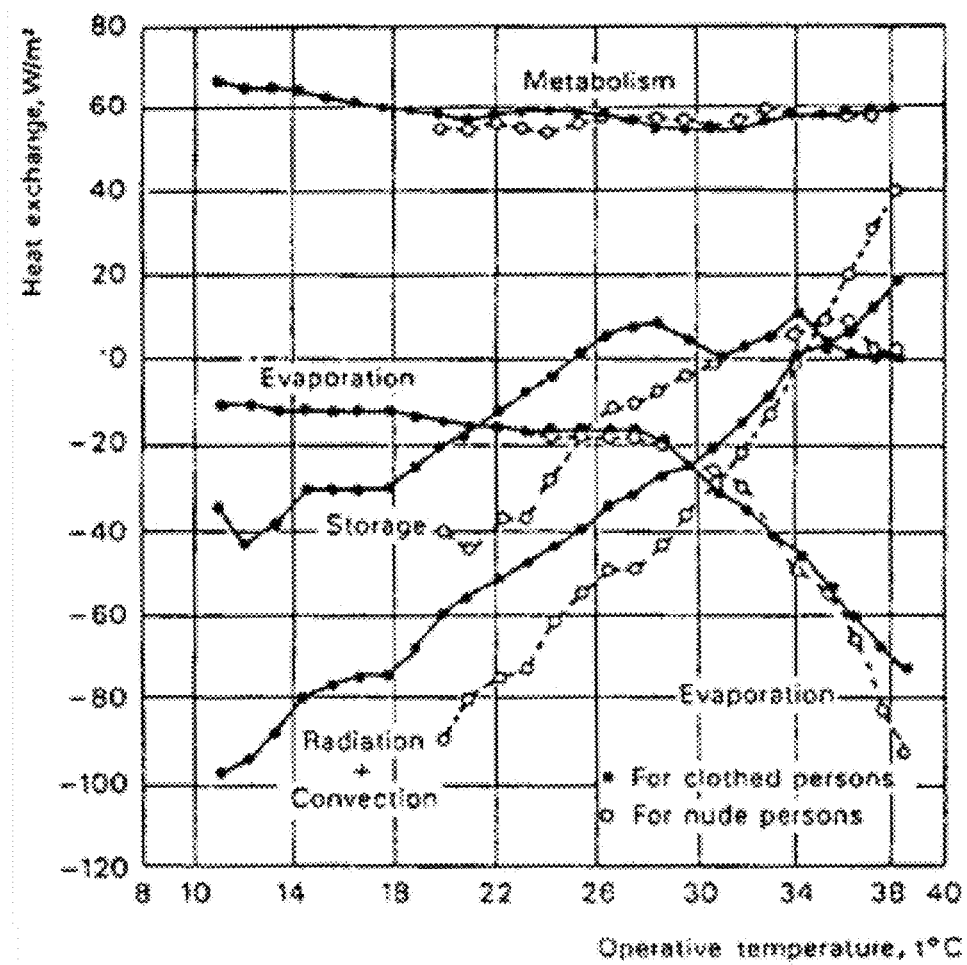
FIG. 21 is a chart illustrating the heat loss and gain of the human body based at various ambient temperatures.
Figure 22:
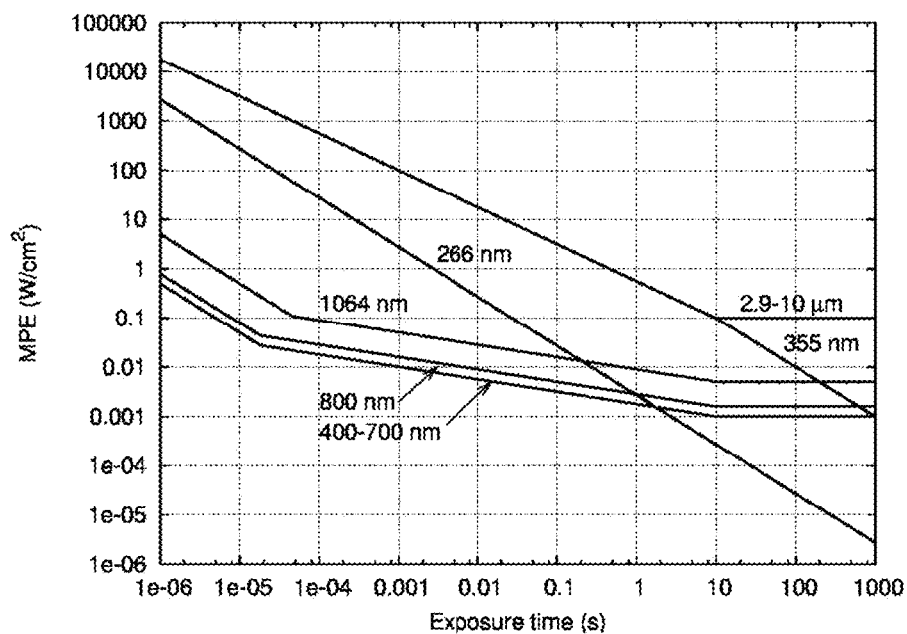
FIG. 22 is a chart illustrating the acceptable Maximum Power Exposure MPE for laser safety comparing power density versus exposure time for various wavelengths.
Figure 23:
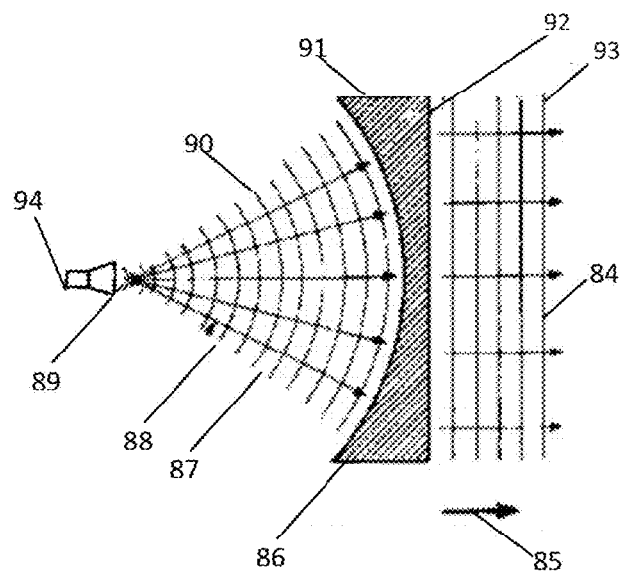
FIG. 23 is a diagram of a parallel plate waveguide lens for microwaves.
Figure 24:
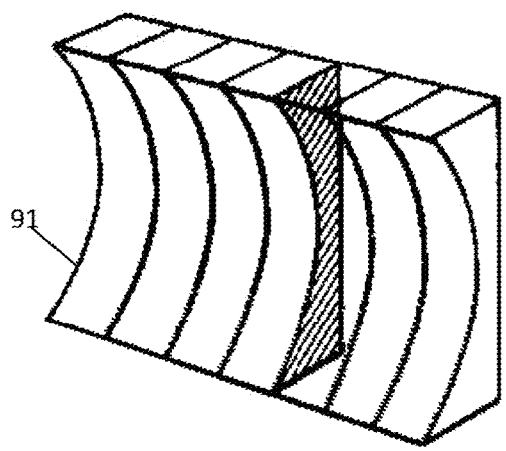
FIG. 24 is an isometric view of a parallel plate waveguide lens for microwaves.
Figure 25:
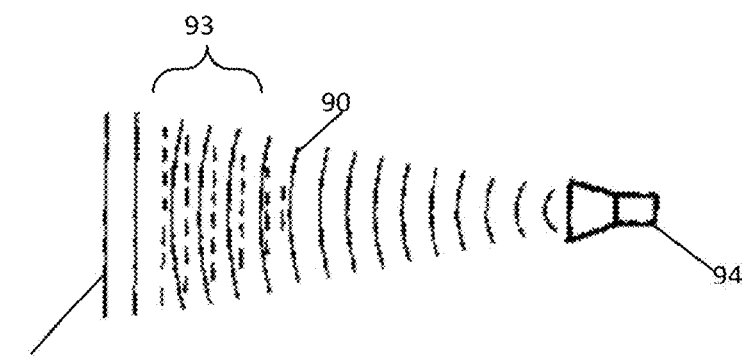
FIG. 25 is a diagram of a delay type lens for microwaves.
Figure 26:
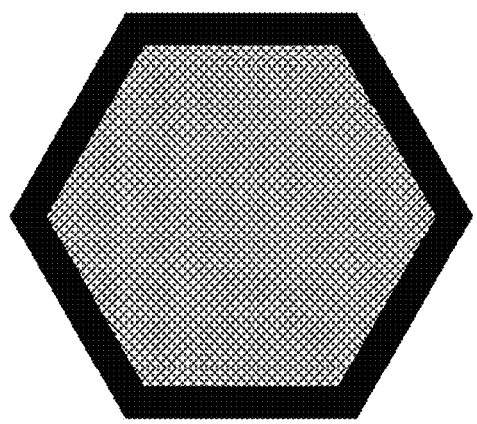
FIG. 26 is a diagram of a loaded lens for microwaves.

As shown in FIG. 18, various types of existing built-in heating systems are shown with their airflow patterns and distribution of temperature. Radiant floor heating (also marked as "Radiant Heating" in FIG. 19) has a similar distribution pattern that suits the preferred usage ("Ideal Heating") pattern of the present invention. The temperature profiles showing a comparison of temperature as compared to the height from the floor or heating source using various heating methods currently in use and as are compared to the ideal curve. As shown in FIG. 19, the typical airflow of a portable heater using convection is shown. The laminar airflow quickly gives way to turbulent airflow making it inefficient to heat a person 65 directly, outside a range of 1.2 meters to 1.8 meters (4 feet to 5 feet). The directional heating of the present invention's HotHeads are therefore a significantly better design and can reach a point of need at distance that are three times this range for about the same power usage. As shown in FIG. 20 modes of heat loss and gain from the human body are shown where 75% of heat transfer is through radiation. This information is further shown in the chart of FIG. 21 that shows the heat exchange from clothed and unclothed humans at various temperatures via various methods (evaporation, radiation, convection, metabolism and storage). Exchange through each mode is more or less dependent on the ambient temperature and humidity. By targeting locations of exposed skin on a person as described in the present invention, points of need (PON) for an individual are efficiently maintained at proper temperatures to provide for perspiration, conduction, convection and radiation of heat from a person's body. The present invention further provides radiant heat using lasers that are well within the laser safety requirements as shown in FIG. 22 that shows the accepted levels for maximum power exposure MPE of power density versus exposure time for various wavelengths. As shown in FIGS. 23-26 various waveguide lenses for use in the MICRO-EMU using microwave radiation may be used in the conditioning system 100 for the electromagnetic radiation unit. As shown in FIG. 23 using a source of microwave radiation 89, such as a feedhorn 94 generates rays in radial sections 88 which creates a spherical wavefront 90 that travels through the air medium 87 and reaches the metallic medium 86 of the collimating parallel metallic strips 91 of a parallel plate lens 91. This lens 91 has the property of converting the spherical waveform to a plane waveform 84 on the exit side 92 of the lens 91, propagating in a direction 85 away from the source. The waveguide parallel plate lens with collimating metallic strips 91 for use in the MICRO-EMU is shown in an isometric view in FIG. 24. In a further embodiment a waveguide lens for the MICRO-EMU is shown in FIG. 25. In this embodiment, a microwave source through a feedhorn 94 generates a spherical wavefront that is collimated by a dielectric convex lens 93 to generate a plane wavefront 93. This type of microwave lens slows the phase propagation (velocity) as the wave passes through the lens. The lens is convex and constructed of dielectric materials. The inner portion of the transmitted wave is decelerated for a longer interval of time than the outer portions. The delay causes the radiated wave to be collimated to be directed at a point of need (PON). In a still further embodiment a loaded microwave lens, as shown in FIG. 26, has a multi-cellular array of thousands of cells that act as a phase controlling device to convert a spherical wavefront to a plane wavefront.

The system architecture for the environment conditioning system of the present invention includes one or more devices, each comprising one or more modules including at least a power module and a housing and at least one module for input, sensor, output, environment conditioning, or processing. Devices have inputs, either physical modules or data received via network interfaces. It is contemplated that several types of sensors will be made available to the present invention including digital video cameras, microphones, pyrometers, cliff sensors, range finders, humidity, odor and tilt sensors. Processors are analog or digital. Analog processors are typically feedback loops. Digital processors comprise at least one of the following: CPU, GPU, FPGA, in addition to memory and optional network adapters. Environment conditioning modules include Thermal Store Units (TSUs) and HotHeads, which comprise EMUs, optics and filters. A networked humidifier is also contemplated that provides moisture as needed. The physical appearance of devices, their identifying features and/or attached QR Codes are used by devices with video cameras to mapping the setting that the devices are in.

Figure 27:
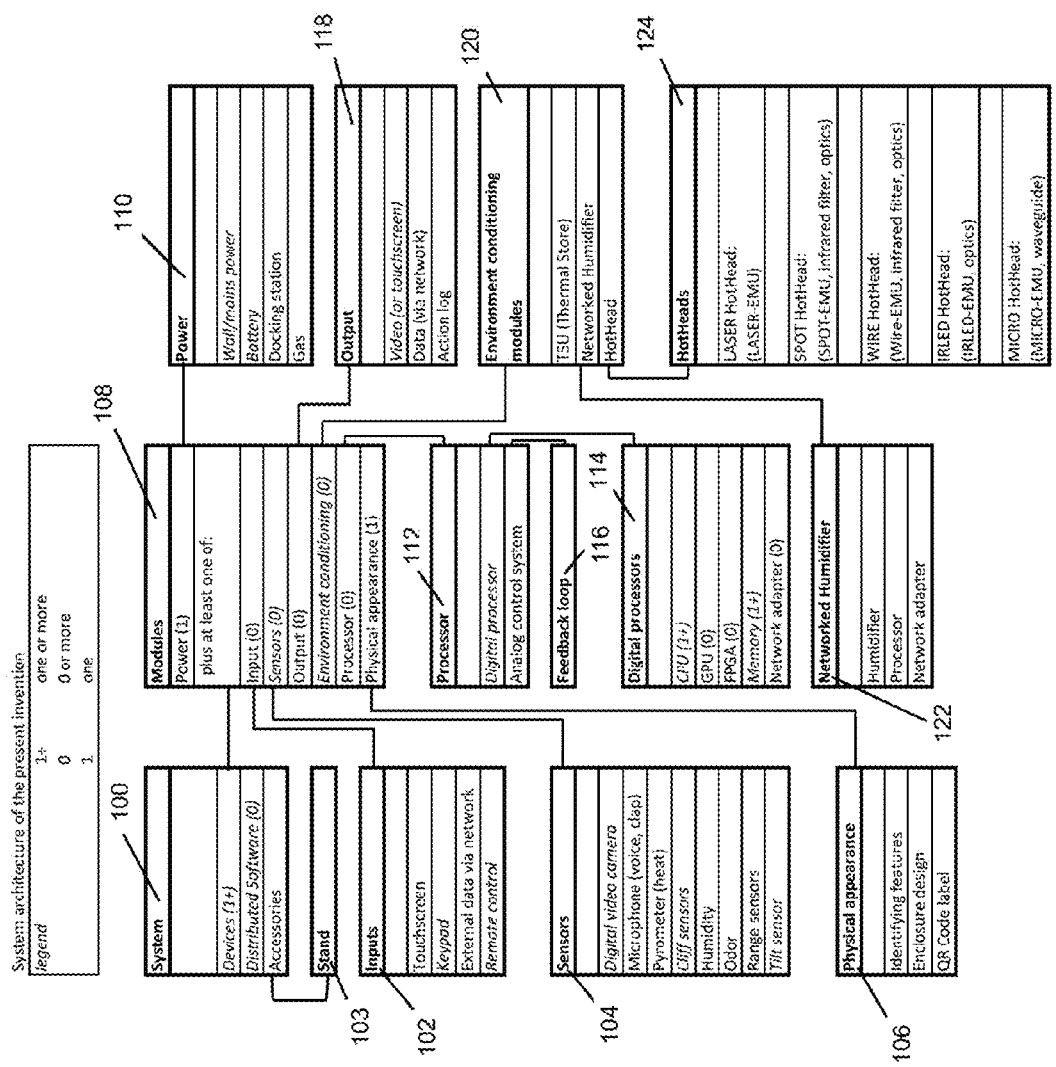
FIG. 27 is a block diagram of the environment conditioning system and modules in an embodiment of the present invention.

As shown in FIG. 27, the distributed, self-organizing environment conditioning system 100 includes integration and control of these devices and accessories using a distributed software network through wired or wireless connections. Communication to and from the system may be facilitated using the stand 3 or other devices. Inputs 102 to the system 100 may be through a touchscreen, keypad, remote control, internet connection or other data entry device. Sensors 104 may include cameras, microphones, temperature sensors, threshold level sensors, humidity measurements, odor sensors, range sensors, speed sensors, location sensors, obstacle sensors, tilt sensors and other data measuring devices. The system 100 may further be designed with physical features 106 that are identifiable by another device within the Setting and environment. The series of modules 108 are integrated with power supplies and power management systems 110 and with processors 112 and control systems. These control systems may be a digital processor 114 such as a computer system, or an analog processor with simple a feedback loop 116. The system 100 may further include output system 118 to provide messaging and diagnostics. To maintain and condition the temperature and humidity within the Setting or environment, the system 100 controls and monitors the environment conditioning modules 120 that include a number of devices such as thermal store units (TSU), networked humidifier devices 122 and HotHeads 124 that include one or more electromagnetic radiation units EMU of various configurations. The integration of these devices provides adaptive and learning behaviors for the system to update and optimally adjust the environment with a Setting.

Figure 28:
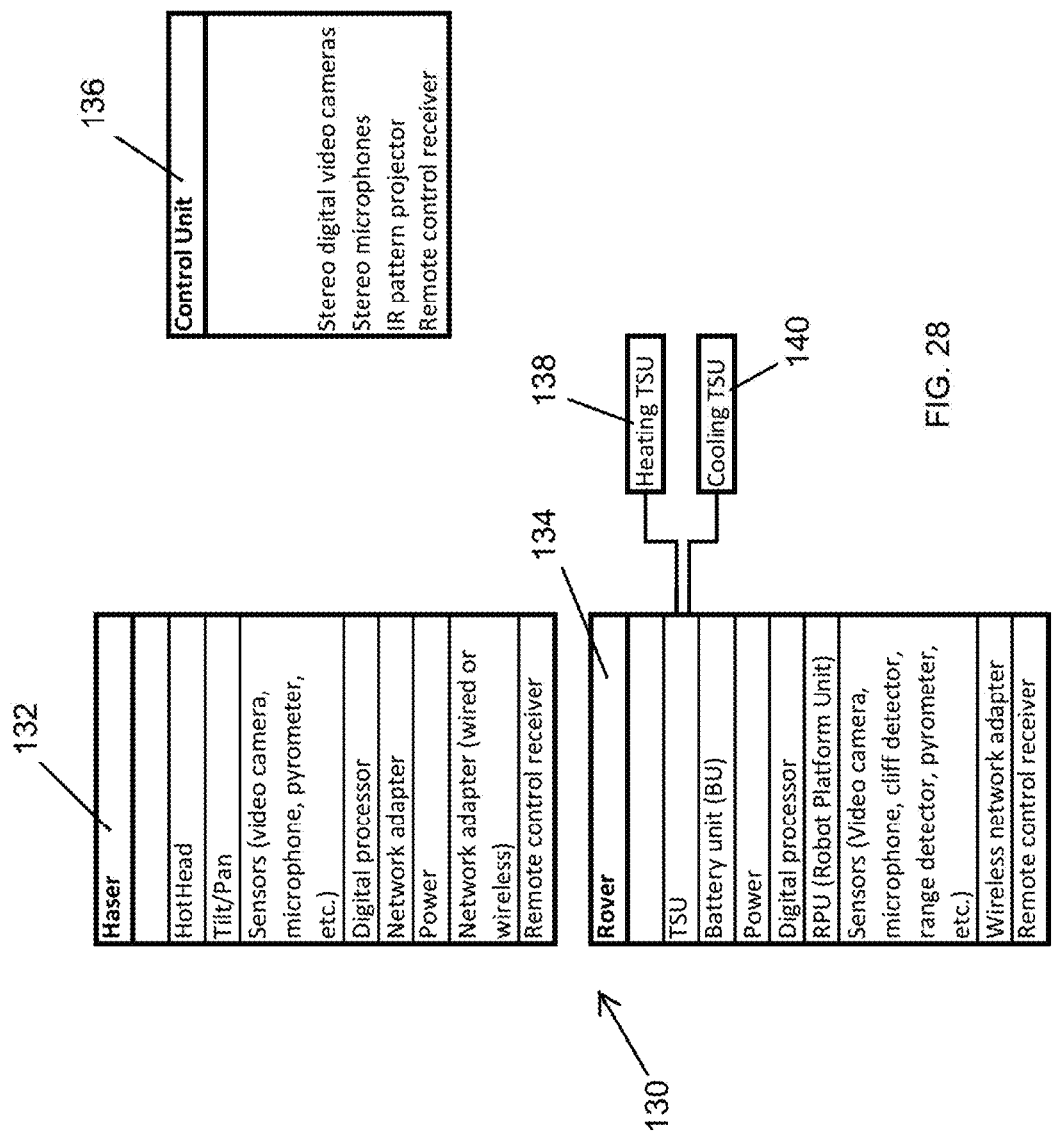
FIG. 28 is a block diagram of the environment conditioning system and devices in an embodiment of the present invention.

In this embodiment as shown in FIG. 28, the system 130 integrates a Haser 132 and a Rover 134 with each device under the control of the Control Unit 136. The Haser 132 may include one or more HotHeads, a Tilt/Pan device, environment monitoring sensors, a digital processor, network adaptors, power supplies and remote control capability. The Rover may include a thermal store unit (TSU), a battery unit (BU), a power supply, a digital processor, a robotic platform unit (RPU), range detection and other mobility sensors, network adaptors and remote control capability. The TSU may be a heating system 138 or a cooling system 140. The control unit (CU) may include digital video cameras, stereo microphones, an infrared (IR) pattern projector and remote control capability.

Figure 29:
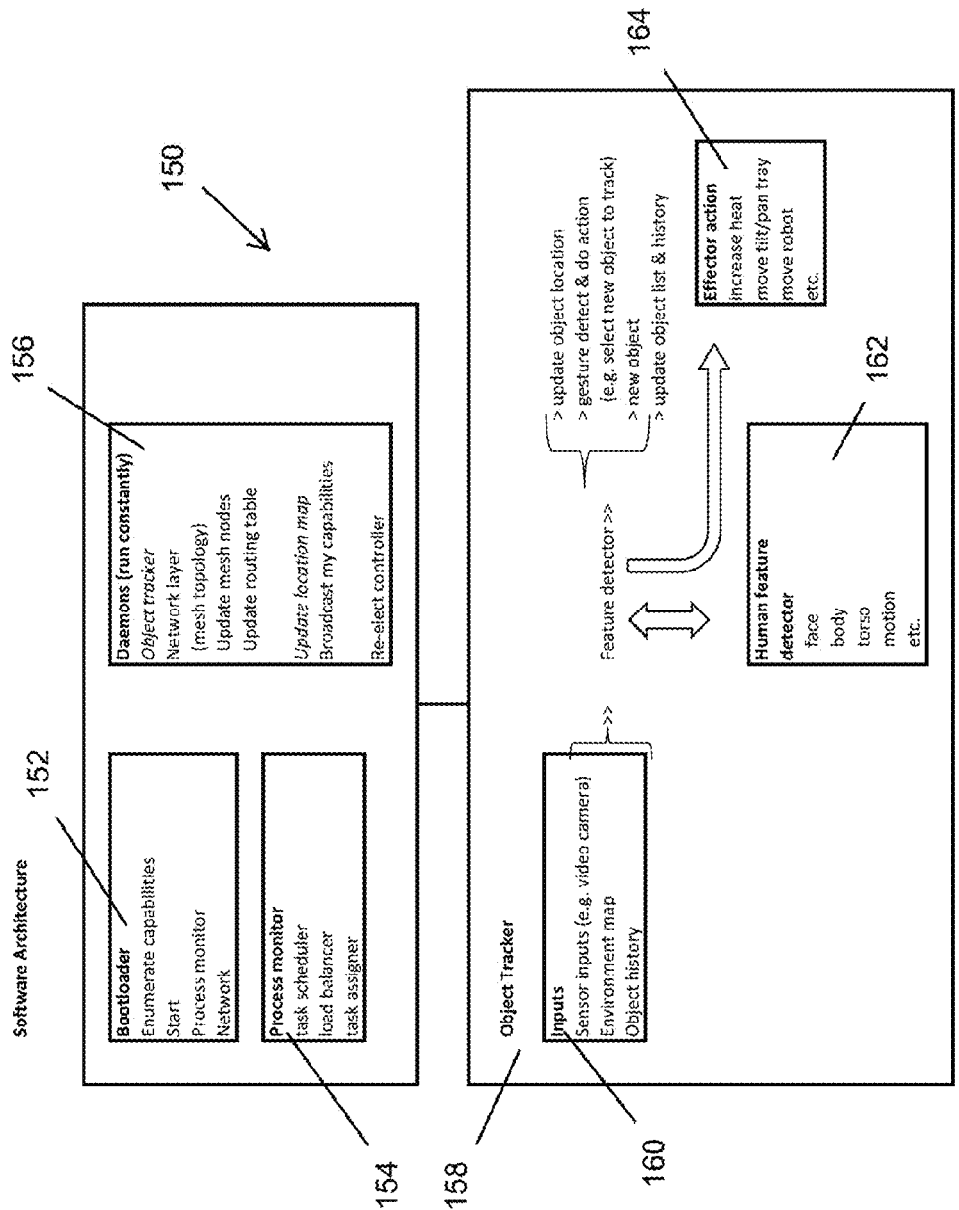
FIG. 29 is a block diagram of an embodiment of the object tracker modules in an embodiment of the present invention.

A further embodiment of the software architecture of the present invention is shown in FIG. 29. In this embodiment, one digital processor in the installation of multiple devices is elected as the controller 150 and this unit determines the actions of the other devices. All digital processors in the installation are contemplated to be available for processing task requests from all other processors. Whenever possible, tasks are executed locally. Other tasks are assigned and scheduled by the controller 150. Load balancing is also done by the controller 150. Each processor has its own bootloader 152 and (simpler) process monitor 154. Background processes (daemons) 156 run continuously. Daemons 156 contemplated include the Object tracker 158, updating the system 2D and 3D maps, broadcasting the devices' capabilities, electing and re-electing system controllers. The object tracker daemon 158 uses sensory inputs (e.g. video camera) 160 to perform feature detection and update the locations of objects of interest, adding this information to its history for logging or adaptive learning of behavioral patterns of the objects, among other uses. Objects of interest are typically humans, which are identified using detection algorithms 162 for motion, face, body and torso detection, among others. The tracker 158 then takes action, such as heating the environment with an Effector 164 such as an EMU or moving a tilt-pan tray or moving a robot platform (RPU).

The invention has been described in detail with particular reference to certain preferred embodiments thereof, but it will be understood that variations and modifications can be effected within the spirit and scope of the invention.

What is claimed is:

1. An extensible networked multi-modal autonomous environment conditioning system, comprising:
    an environment;
    at least one control unit;
    at least one electromagnetic radiation unit for directing electromagnetic radiation to a point of need, the electromagnetic radiation unit being one of at least a laser electromagnetic radiation unit, a spot electromagnetic radiation unit, a wire electromagnetic radiation unit, an infrared light emitting diode electromagnetic radiation unit and a microwave source electromagnetic radiation unit; and
    wherein the intensity of the laser electromagnetic radiation unit is reduced using direct diodes and beam splitters to spread an electromagnetic radiation beam to maintain the beam at intensities within eye safety levels; and
    wherein the at least one control unit directs the electromagnetic radiation unit to a moving animate object and radiates the animate object only at a desired point of need area to selectively adjust the temperature of the animate object.

2. The extensible networked multi-modal autonomous environment conditioning system of claim 1 further comprising at least one robotic platform unit.

3. The extensible networked multi-modal autonomous environment conditioning system of claim 1 further comprising at least one thermal store unit.

4. The extensible networked multi-modal autonomous environment conditioning system of claim 1 further comprising a monitoring unit that tracks at least one of temperature, humidity, shade, air circulation, air quality and odors.

5. The extensible networked multi-modal autonomous environment conditioning system of claim 1 further comprising a rechargeable battery system.

6. The extensible networked multi-modal autonomous environment conditioning system of claim 1 wherein the at least one control unit communicates with at least another control unit to self-organize, share information and enhance functionality over the environmental setting of the control units.

7. The extensible networked multi-modal autonomous environment conditioning system of claim 6 wherein the shared information is one of at least sensor data, list of capabilities, user preferences, historic environmental data and dynamically generated maps of the settings.

8. The extensible networked multi-modal autonomous environment conditioning system of claim 1 wherein the electromagnetic radiation unit having a heating element and optical elements that focus electromagnetic radiation emitted by the heating element in a collimated beam.

9. The extensible networked multi-modal autonomous environment conditioning system of claim 1 wherein the electromagnetic radiation unit radiates a target at a range of 3 meters to 4.5 meters (10 feet to 15 feet).

10. The extensible networked multi-modal autonomous environment conditioning system of claim 1 wherein at least one control unit detects an animate object by tracking motion of the object through gestures.

11. A method of thermally conditioning an environment, comprising the steps of:
 mapping a setting;
 detecting movement of an animate object through gestures within the setting;
 determining a point of need on the animate object;
 directing electromagnetic radiation to the point of need using one of at least a laser electromagnetic radiation unit, a spot electromagnetic radiation unit, a wire electromagnetic radiation unit, an infrared light emitting diode electromagnetic radiation unit and a microwave source electromagnetic radiation unit; and
 reducing the intensity of the laser electromagnetic radiation unit using direct diodes and beam splitters and spreading the beam to maintain the beam at intensities within eye safety levels; and
 adjusting the temperature of the animate object based on sensing of environmental conditions.

12. A method of thermally conditioning an environment of claim 11 further comprising the step of moving the electromagnetic radiation source towards the animate object using a robotic platform unit.

13. A method of thermally conditioning an environment of claim 11 further comprising the step of moving a thermal store unit towards the animate object using a robotic platform unit.

14. A method of thermally conditioning an environment of claim 11 further comprising the step of monitoring one of at least temperature, humidity, shade, air circulation, air quality and odors.

15. A method of thermally conditioning an environment of claim 12 further comprising the step of recharging one of at least the electromagnetic radiation source and the robotic platform unit.

16. A method of thermally conditioning an environment of claim 11 further comprising the step of communicating with at least one control unit to self-organize, share information and enhance functionality over the environmental setting(s) they are in.

17. A method of thermally conditioning an environment of claim 16 further comprising the step of communicating shared information that is one of at least sensor data, list of capabilities, user preferences, historic environmental data and dynamically generated maps of the settings.

18. A method of thermally conditioning an environment of claim 11 further comprising the step of directing the electromagnetic radiation to a point of need that is at a distance from the electromagnetic radiation source in a range of 3 meters to 4.5 meters (10 feet to 15 feet).

* * * * *